United States Patent
Vargas et al.

(10) Patent No.: US 12,192,785 B2
(45) Date of Patent: Jan. 7, 2025

(54) TRANSMIT/RECEIVE BEAM ASSOCIATION IN MILLIMETER WAVE V2X

(71) Applicant: QUALCOMM Incorporated, San Diego, CA (US)

(72) Inventors: Jose Edson Vargas, San Diego, CA (US); Tao Luo, San Diego, CA (US); Zhibin Wu, Los Altos, CA (US); Makesh Pravin John Wilson, San Diego, CA (US); Sudhir Kumar Baghel, Hillsborough, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 16/714,478

(22) Filed: Dec. 13, 2019

(65) Prior Publication Data

US 2020/0196162 A1 Jun. 18, 2020

Related U.S. Application Data

(60) Provisional application No. 62/780,915, filed on Dec. 17, 2018.

(51) Int. Cl.
*H04W 16/28* (2009.01)
*H04W 4/40* (2018.01)

(52) U.S. Cl.
CPC ............ *H04W 16/28* (2013.01); *H04W 4/40* (2018.02)

(58) Field of Classification Search
CPC ......... H04W 16/28; H04W 4/40; H04W 4/70; H04W 74/0833; H04W 56/0025;
(Continued)

(56) References Cited

U.S. PATENT DOCUMENTS 9,363,683 B2 6/2016 Raghavan et al.
2015/0029966 A1* 1/2015 Park .................. H04L 5/005
370/329
(Continued)

FOREIGN PATENT DOCUMENTS

CN 107710716 A 2/2018
WO 2016010685 A1 1/2016
(Continued)

OTHER PUBLICATIONS

Ericsson: "Remaining Details on RACH Procedure", 3GPP Draft, R1-1718716 Remaining Details on RACH Procedure, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 3, 2017 (Oct. 3, 2017), XP051353213, 21 pages, Retrieved from the Internet: URL: http://www.3gpp.org/ftp/tsg_ran/WG1_RL_1/TSGR1_90b/Docs/. [retrieved on Oct. 3, 2017] p. 15. line 31—p. 16, line 9.
(Continued)

*Primary Examiner* — Noel R Beharry
*Assistant Examiner* — Wilfred Thomas
(74) *Attorney, Agent, or Firm* — Muncy, Geissler, Olds & Lowe, P.C./Qualcomm Incorporated

(57) ABSTRACT

Disclosed are techniques for transmit/receive (TX/RX) beam association in millimeter wave (mmW) vehicle-to-everything (V2X) communications. In conventional wireless systems, a node (e.g., gNB) that manages wireless resources is typically stationary. This means that transmissions from the network node over the same TX beam using the same antenna array orientation can be assumed to be quasi-collocated (QCLed) and communications may be established using fixed-to-mobile beam management approach. However, if the transmitting node is mobile, a
(Continued)

quasi-collocation (QCL) assumption may not be valid. To address issues due to mobility of the nodes that manage wireless resources, a mobile-to-mobile beam management approach is proposed.

38 Claims, 12 Drawing Sheets

(58) Field of Classification Search
CPC ....... H04L 5/005; H04L 5/0053; H04B 7/022; H04B 7/0695; H04B 7/088
See application file for complete search history.

(56) References Cited

U.S. PATENT DOCUMENTS

| | | | | |
|---|---|---|---|---|
| 2018/0219606 A1* | 8/2018 | Ng | ................. | H04L 5/0053 |
| 2018/0343653 A1* | 11/2018 | Guo | ................. | H04W 16/28 |
| 2019/0014493 A1* | 1/2019 | Kim | ................. | H04B 17/318 |
| 2019/0074880 A1* | 3/2019 | Frenne | ................. | H04B 7/0617 |
| 2019/0150161 A1* | 5/2019 | Cheng | ................. | H04W 24/08 370/330 |
| 2019/0268852 A1* | 8/2019 | Ryu | ................. | H04W 56/001 |
| 2020/0037293 A1* | 1/2020 | Reial | ................. | H04W 48/08 |
| 2020/0045735 A1* | 2/2020 | Kim | ................. | H04W 16/28 |
| 2020/0053786 A1* | 2/2020 | Kim | ................. | H04W 74/006 |
| 2020/0059277 A1* | 2/2020 | Su | ................. | H04B 7/0473 |
| 2020/0059951 A1* | 2/2020 | Frenne | ................. | H04L 5/0023 |
| 2020/0187258 A1* | 6/2020 | Lee | ................. | H04W 74/0833 |
| 2020/0220680 A1* | 7/2020 | Yamada | ................. | H04W 72/042 |
| 2020/0221429 A1* | 7/2020 | Li | ................. | H04L 5/0053 |
| 2020/0280409 A1* | 9/2020 | Grant | ................. | H04W 72/042 |
| 2020/0288503 A1* | 9/2020 | Sahlin | ................. | H04W 72/04 |
| 2020/0329503 A1* | 10/2020 | Da Silva | ................. | H04W 72/02 |
| 2021/0091902 A1* | 3/2021 | Yamada | ................. | H04B 7/0452 |
| 2021/0126677 A1* | 4/2021 | Park | ................. | H04L 5/0053 |
| 2021/0135810 A1* | 5/2021 | Yamada | ................. | H04L 5/0053 |
| 2021/0195452 A1* | 6/2021 | Harada | ................. | H04L 5/0053 |
| 2021/0400725 A1* | 12/2021 | Harada | ................. | H04L 5/0007 |
| 2021/0409098 A1* | 12/2021 | Matsumura | ................. | H04B 7/0834 |
| 2022/0061087 A1* | 2/2022 | Koskela | ................. | H04W 72/046 |

FOREIGN PATENT DOCUMENTS

| | | |
|---|---|---|
| WO | 2018128410 A1 | 7/2018 |
| WO | 2018144873 A1 | 8/2018 |
| WO | 2018172987 A1 | 9/2018 |
| WO | 2018174803 A1 | 9/2018 |

OTHER PUBLICATIONS

International Search Report and Written Opinion—PCT/US2019/066614—ISA/EPO—Apr. 20, 2020.

* cited by examiner

TRANSMIT/RECEIVE BEAM ASSOCIATION IN MILLIMETER WAVE V2X

CROSS-REFERENCE TO RELATED APPLICATION

The present Application for Patent claims the benefit of U.S. Provisional Patent Application No. 62/780,915 entitled "TRANSMIT/RECEIVE BEAM ASSOCIATION IN MILLIMETER WAVE V2X," filed Dec. 17, 2018, assigned to the assignee hereof, and expressly incorporated herein by reference in its entirety.

TECHNICAL FIELD

Various aspects described herein generally relate to wireless communication systems, and more particularly, to transmit/receive (TX/RX) beam association in millimeter wave (mmW) vehicle-to-everything (V2X) communications.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments.

A way to achieve high data rates is to operate in very high frequencies. For example, communications can be conducted using radio frequencies (RFs) in a range of 30 GHz to 300 GHz. These frequencies correspond to electromagnetic waves with wavelengths that range between 1 millimeter and 10 millimeters. Radio waves in this band may be referred to as a millimeter wave or mmW. Communications using the mmW or near mmW radio frequency band have high path loss and therefore a relatively short range. In 5G, beamforming, which is a form of directional communication, is used to compensate for such losses. Such directional links can entail an accurate alignment of a beam pair link (BPL), i.e., or transmitted and received beams. Beam management operations are included in 5G NR to enable such an alignment. However, different than in conventional fixed-to-mobile communications, establishing and maintaining aligned BPLs when both the transmitter and the receiver are mobile as in mobile-to-mobile communications, is a challenge

SUMMARY

This summary identifies features of some example aspects of the disclosed subject matter, and is not intended to be an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary synchronization signal block (SSB) receiver is disclosed. The SSB receiver comprises a transceiver, a memory, and a processor communicatively coupled to the transceiver and the memory. The transceiver, the memory, and/or the processor are configured to receive, from an SSB transmitter, an SSB on an SSB receive (RX) beam in a transmitter-to-receiver (T2R) direction. The SSB comprises an SSB index corresponding to the SSB RX beam. The transceiver, the memory, and/or the processor are also configured to transmit, to the SSB transmitter, a physical random access channel (PRACH) preamble on a first receiver-to-transmitter (R2T) beam in a first R2T direction. The PRACH preamble is based on the SSB. The transceiver, the memory, and/or the processor are further configured to transmit, to the SSB transmitter, the PRACH preamble on a second R2T beam in a second R2T direction different from the first R2T direction when a Random Access Response (RAR) is not received from the SSB transmitter within an RAR response window subsequent to transmitting the PRACH preamble on the first R2T beam, and when a quasi-collocation (QCL) flag is set to QCL invalid. The QCL flag is set to QCL valid when a QCL assumption is valid and is set to QCL invalid when the QCL assumption is not valid. The QCL assumption is valid when transmissions from the SSB transmitter are QCLed, and is invalid otherwise.

An exemplary method performed by a synchronization signal block (SSB) receiver is disclosed. The method comprises receiving, from an SSB transmitter, an SSB on an SSB receive (RX) beam in a transmitter-to-receiver (T2R) direction. The SSB comprises an SSB index corresponding to the SSB RX beam. The method also comprises transmitting, to the SSB transmitter, a physical random access channel (PRACH) preamble on a first receiver-to-transmitter (R2T) beam in a first R2T direction. The PRACH preamble is based on the SSB. The method further comprises transmitting, to the SSB transmitter, the PRACH preamble on a second R2T beam in a second R2T direction different from the first R2T direction when a Random Access Response (RAR) is not received from the SSB transmitter within an RAR response window subsequent to transmitting the PRACH preamble on the first R2T beam, and when a quasi-collocation (QCL) flag is set to QCL invalid. The QCL flag is set to QCL valid when a QCL assumption is valid and is set to QCL invalid when the QCL assumption is not valid. The QCL assumption is valid when transmissions from the SSB transmitter are QCLed, and is invalid otherwise.

Another synchronization signal block (SSB) receiver is disclosed. The SSB receiver comprises means for receiving, from an SSB transmitter, an SSB on an SSB receive (RX) beam in a transmitter-to-receiver (T2R) direction. The SSB comprises an SSB index corresponding to the SSB RX beam. The SSB receiver also comprises means for transmitting, to the SSB transmitter, a physical random access channel (PRACH) preamble on a first receiver-to-transmitter (R2T) beam in a first R2T direction. The PRACH preamble is based on the SSB. The SSB receiver further comprises means for transmitting, to the SSB transmitter, the PRACH preamble on a second R2T beam in a second R2T direction different from the first R2T direction when a Random Access Response (RAR) is not received from the SSB transmitter within an RAR response window subsequent to transmitting the PRACH preamble on the first R2T beam, and when a quasi-collocation (QCL) flag is set to QCL invalid. The QCL flag is set to QCL valid when a QCL assumption is valid and is set to QCL invalid when the QCL assumption is not valid. The QCL assumption is valid when transmissions from the SSB transmitter are QCLed, and is invalid otherwise.

An exemplary non-transitory computer-readable medium storing computer-executable instructions for a synchronization signal block (SSB) receiver is disclosed. The computer-executable instructions comprise one or more instructions causing the SSB receiver to receive, from an SSB transmitter, an SSB on an SSB receive (RX) beam in a transmitter-to-receiver (T2R) direction. The SSB comprises an SSB index corresponding to the SSB RX beam. The computer-executable instructions also comprise one or more instructions causing the SSB receiver to transmit, to the SSB transmitter, a physical random access channel (PRACH) preamble on a first receiver-to-transmitter (R2T) beam in a first R2T direction. The PRACH preamble is based on the SSB. The computer-executable instructions further comprise one or more instructions causing the SSB receiver to transmit, to the SSB transmitter, the PRACH preamble on a second R2T beam in a second R2T direction different from the first R2T direction when a Random Access Response (RAR) is not received from the SSB transmitter within an RAR response window subsequent to transmitting the PRACH preamble on the first R2T beam, and when a quasi-collocation (QCL) flag is set to QCL invalid. The QCL flag is set to QCL valid when a QCL assumption is valid and is set to QCL invalid when the QCL assumption is not valid. The QCL assumption is valid when transmissions from the SSB transmitter are QCLed, and is invalid otherwise.

An exemplary synchronization signal block (SSB) transmitter is disclosed. The SSB transmitter comprises a transceiver, a memory, and a processor communicatively coupled to the transceiver and the memory. The transceiver, the memory, and/or the processor are configured to transmit, to an SSB receiver, an SSB on a first transmitter-to-receiver (T2R) in a first T2R direction. The SSB comprises an SSB index corresponding to the first T2R beam. The transceiver, the memory, and/or the processor are also configured to receive, from the SSB receiver, a physical random access channel (PRACH) preamble on a Msg1 RX beam in a receiver-to-transmitter (R2T) direction. The PRACH preamble is based on the SSB transmitted on the first T2R beam. The transceiver, the memory, and/or the processor are further configured to transmit, to the SSB receiver, a Random Access Response (RAR) on a second T2R beam in a second T2R direction in response to receiving the PRACH preamble. The second T2R direction is different from the first T2R direction when a quasi-collocation (QCL) flag is set to QCL invalid. The QCL flag is set to QCL valid when a QCL assumption is valid and is set to QCL invalid when the QCL assumption is not valid. The QCL assumption is valid when transmissions from the SSB transmitter are QCLed, and is invalid otherwise.

An exemplary method performed by a synchronization signal block (SSB) transmitter is disclosed. The method comprises transmitting, to an SSB receiver, an SSB on a first transmitter-to-receiver (T2R) in a first T2R direction. The SSB comprises an SSB index corresponding to the first T2R beam. The method also comprises receiving, from the SSB receiver, a physical random access channel (PRACH) preamble on a Msg1 RX beam in a receiver-to-transmitter (R2T) direction. The PRACH preamble is based on the SSB transmitted on the first T2R beam. The method further comprises transmitting, to the SSB receiver, a Random Access Response (RAR) on a second T2R beam in a second T2R direction in response to receiving the PRACH preamble. The second T2R direction is different from the first T2R direction when a quasi-collocation (QCL) flag is set to QCL invalid. The QCL flag is set to QCL valid when a QCL assumption is valid and is set to QCL invalid when the QCL assumption is not valid. The QCL assumption is valid when transmissions from the SSB transmitter are QCLed, and is invalid otherwise.

Another synchronization signal block (SSB) transmitter is disclosed. The SSB receiver comprises means for transmitting, to an SSB receiver, an SSB on a first transmitter-to-receiver (T2R) in a first T2R direction. The SSB comprises an SSB index corresponding to the first T2R beam. The SSB receiver also comprises means for receiving, from the SSB receiver, a physical random access channel (PRACH) preamble on a Msg1 RX beam in a receiver-to-transmitter (R2T) direction. The PRACH preamble is based on the SSB transmitted on the first T2R beam. The SSB receiver further comprises means for transmitting, to the SSB receiver, a Random Access Response (RAR) on a second T2R beam in a second T2R direction in response to receiving the PRACH preamble. The second T2R direction is different from the first T2R direction when a quasi-collocation (QCL) flag is set to QCL invalid. The QCL flag is set to QCL valid when a QCL assumption is valid and is set to QCL invalid when the QCL assumption is not valid. The QCL assumption is valid when transmissions from the SSB transmitter are QCLed, and is invalid otherwise.

An exemplary non-transitory computer-readable medium storing computer-executable instructions for a synchronization signal block (SSB) transmitter is disclosed. The computer-executable instructions comprise one or more instructions causing the SSB transmitter to transmit, to an SSB receiver, an SSB on a first transmitter-to-receiver (T2R) in a first T2R direction. The SSB comprises an SSB index corresponding to the first T2R beam. The computer-executable instructions also comprise one or more instructions causing the SSB transmitter to receive, from the SSB receiver, a physical random access channel (PRACH) preamble on a Msg1 RX beam in a receiver-to-transmitter (R2T) direction. The PRACH preamble is based on the SSB transmitted on the first T2R beam. The computer-executable instructions further comprise one or more instructions causing the SSB transmitter to transmit, to the SSB receiver, a Random Access Response (RAR) on a second T2R beam in a second T2R direction in response to receiving the PRACH preamble. The second T2R direction is different from the first T2R direction when a quasi-collocation (QCL) flag is set to QCL invalid. The QCL flag is set to QCL valid when a QCL assumption is valid and is set to QCL invalid when the QCL assumption is not valid. The QCL assumption is valid when transmissions from the SSB transmitter are QCLed, and is invalid otherwise.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
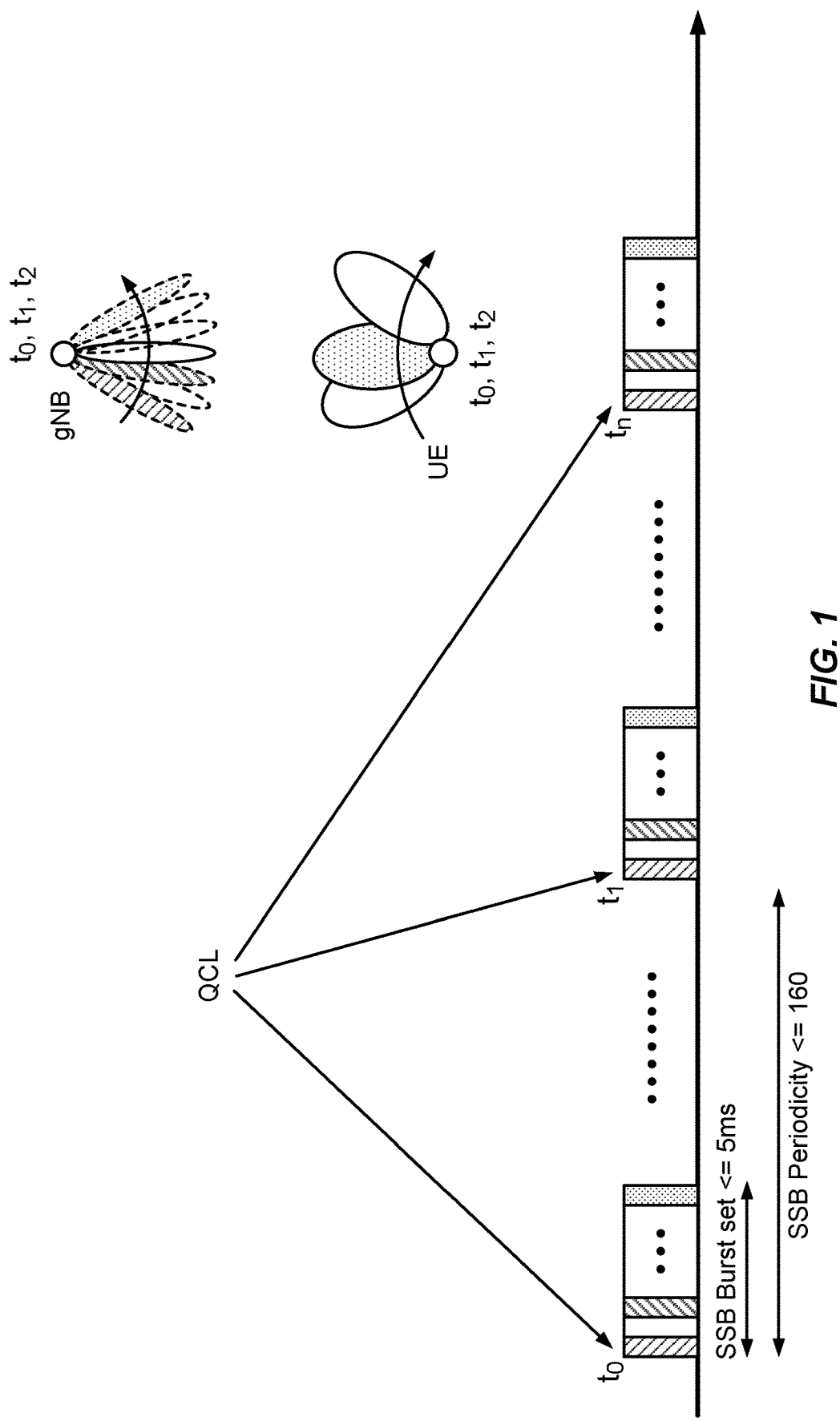
FIG. 1 illustrates an example of a conventional scenario in which an initial access procedure is performed to establish a communication link between a gNB and a UE using a conventional fixed-to-mobile beam management approach.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE) and "base station" are not intended to be specific or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide edge node signaling functions while in other systems it may provide additional control and/or network management functions.

UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As mentioned above, one way to achieve high data rates is to operate in very high frequencies such as in millimeter waves (mmW). One disadvantage of radio waves with such high frequencies is high path loss, which in turn means that the operation range is relatively short. Beamforming can compensate by directing the transmission energy as much as possible towards the intended receiver. Therefore, beamforming is a form of directional communication. Such directional links can involve an accurate alignment of a beam pair link (BPL), i.e., of transmitted and received beams. Beam management operations are included in 5G NR to enable such an alignment.

Transmit "beamforming" is a technique for focusing a radio frequency (RF) signal in a specific direction. Traditionally, when a network node (e.g., a gNodeB or gNB) broadcasts an RF signal, it broadcasts the signal in all directions (omni-directionally). With transmit beamforming, the network node determines where a given target device (e.g., UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), SINR, etc.) of the RF signals received from that direction.

Transmit beams may be quasi-collocated (QCLed), meaning that they appear to the receiver as having the same parameters, regardless of whether or not the transmitting antennas themselves are physically collocated. In other words, the receiver may derive certain parameters about a second reference signal on a second beam from information about a source reference signal on a source beam. These parameters include any one or more of Doppler spread, Doppler shift, average gain, average delay, delay spread, and, when applicable, spatial Rx parameters.

Figure 2:
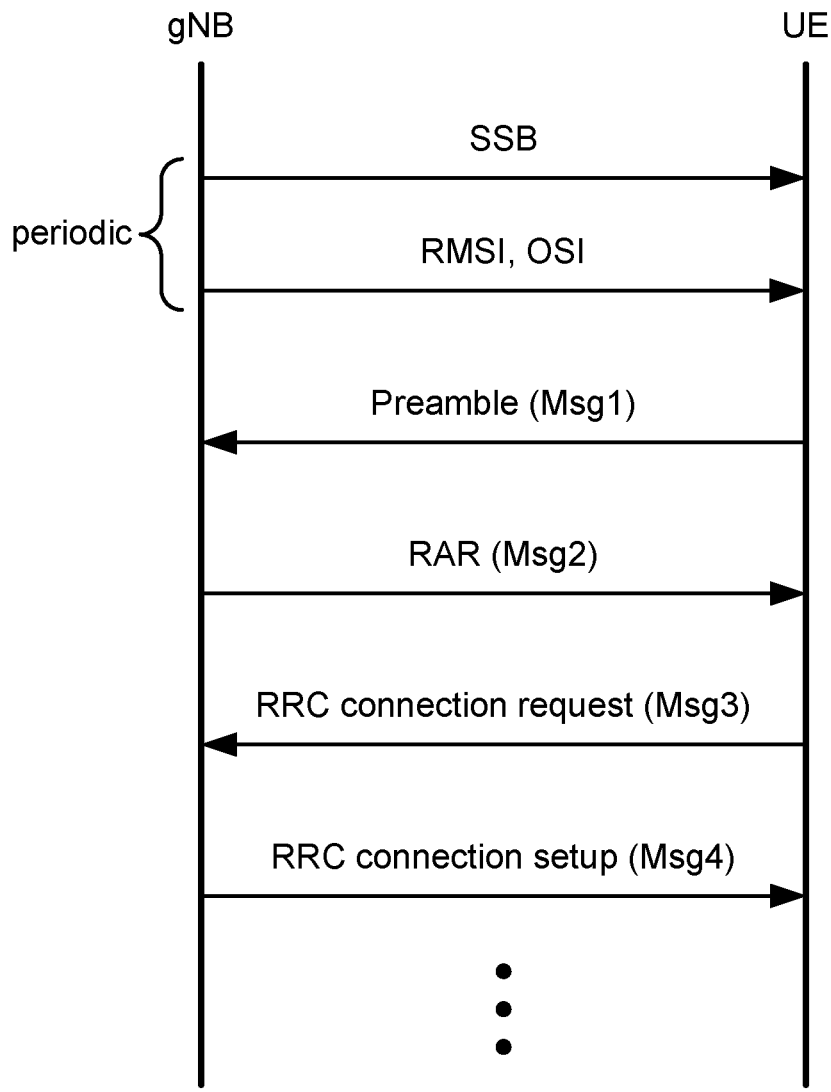
FIG. 2 illustrates the signals exchanged between nodes for the initial access procedure in the conventional scenario.

FIG. 1 illustrates a typical scenario in which an initial access procedure—a type of random access procedure—is performed to establish a communication link between a gNB and a UE. FIG. 2 illustrates the signals exchanged between the gNB and the UE for the initial access procedure. To enable initial access, the gNB periodically broadcasts some minimum system information (e.g., system information block (SIB), master information block (MIB)) in synchronization signal blocks (SSBs). Each SSB carries the primary synchronization signal (PSS), secondary synchronization signal (SSS), and physical broadcast channel (PBCH). The SSBs inform the UE to the resources that can be used to perform the random access.

The gNB performs beam sweeping to transmit the SSBs. Beam sweeping is a way of covering a spatial area with a set of beams according to predefined intervals and directions. As illustrated in FIGS. 1 and 2, the gNB transmits the SSBs in SSB bursts that periodically repeat. As illustrated in FIG. 2, the gNB may also periodically transmit remaining minimum system information (RMSI) and other system information (OSI) carried on the physical data shared channel (PDSCH).

Regarding the SSBs, the gNB transmits multiple SSBs within one SSB burst. An SSB burst set defines a window (e.g., 5 ms) within which a number of SSBs are transmitted. In FIG. 1, the gNB is illustrated as transmitting SSB bursts at times t0, t1, . . . , tn, . . . . Each SSB within one SSB burst can be uniquely identified by an SSB index. Also, each SSB within one SSB burst is transmitted in a specific downlink (DL) beam radiated in a particular direction. That is, there is a correspondence between the SSB index and the DL beam used to transmit the SSB. The SSB burst repeats in SSB periodicity (5/10/20/40/80/160 ms). That is, the times t0, t1, . . . , tn, . . . are separated by the SSB periodicity.

The UE can receive one or more of the DL beams transmitted from the gNB and selects the best one. For example, the DL beam with the highest received power may be selected. Typically, this is the DL beam that is transmitted in the direction of the UE from the gNB. Since, in one implementation, the SSBs uniquely correspond to the DL beams, in such an implementation, selecting a DL beam effectively selects the SSB. After the DL beam selection, the UE transmits in an uplink (UL) beam a physical random access channel (PRACH) preamble to the gNB. The PRACH preamble, also referred to as Msg1, is based on the SSB so that the gNB is informed of the DL beam selected by the UE.

The directions of the UL beam and the direction of the selected DL beam are aligned with each other.

In response to receiving the PRACH preamble, the gNB responds with a random access response (RAR) message, also referred to as Msg2. Upon receiving the RAR and successful decoding thereof, the UE sends a radio resource control (RRC) connection request, also referred to as Msg3, to the gNB. The gNB responds with an RRC connection setup, also referred to as Msg4.

After sending transmitting the PRACH preamble (Msg1), if the UE does not receive the RAR (Msg2) within an RAR window duration of time, the UE transmits the same PRACH preamble (Msg1) with increased power. Nonetheless, the retransmission is on the same UL direction. In other words, the direction of the UL beam for the Msg1 retransmission aligned with the selected DL beam.

This is logical when the gNB is stationary. Referring back to FIG. 1, when the gNB is stationary, then each SSB transmitted with the same index is transmitted in the same direction in each SSB burst. For example, assume that at each SSB burst, K DL beams are used to transmit K SSB's with indices SSB(k), where k=0, 1, 2, ... K−1. In other words, at each SSB burst time t0, t1, ..., tn, ..., SSB(0) is transmitted on the first DL beam in a first direction, SSB(1) is transmitted on a second beam in a second direction, and so on. In general, SSB(k) at each SSB burst time tn is transmitted in a same direction. Therefore, it can be assumed that SSBs transmitted (such as, for example, transmissions from an SSB transmitter) with the same SSB index on a same center frequency location are QCLed, meaning that they appear to the UE as having the same parameters (e.g., Doppler spread, Doppler shift, average gain, average delay, delay spread, and, when applicable, spatial Rx parameters).

This means that the initial access messages Msg1, Msg2, Msg3 and Msg4 can be completed in the same beam. Spatial quasi-collocation (QCL) assumptions are used by the UE to select the analog beam for future transmit/receive (TX/RX) based on the most recent successful reception. Thus, in cellular 5G NR mmW networks, a geographically fixed gNB with fixed antenna array orientations serve mobile UEs using fixed-to-mobile beam management approach in which QCL may be assumed.

However, in mmW vehicle-to-everything (V2X) communications, the gNB can also be mobile, and the discovery can be mutual. In conventional mmW cellular systems, transmission of SSBs is reserved to gNB, i.e., UE does not transmit SSBs—it only processes them. In V2X, UE receives and processes SSBs, but can also transmit SSBs. V2X communications include, among others, vehicle-to-vehicle (V2V), vehicle-to-infrastructure (V2I), vehicle-to-pedestrian (V2P), and vehicle-to-network (V2N). From the perspective of the UE, two antenna beams are not QCLed if they use antennas from different locations and/or different antenna array orientation. If the gNB moves, antenna beams, even if transmitted from the same antenna ports, are nonetheless from different locations.

Figure 3:
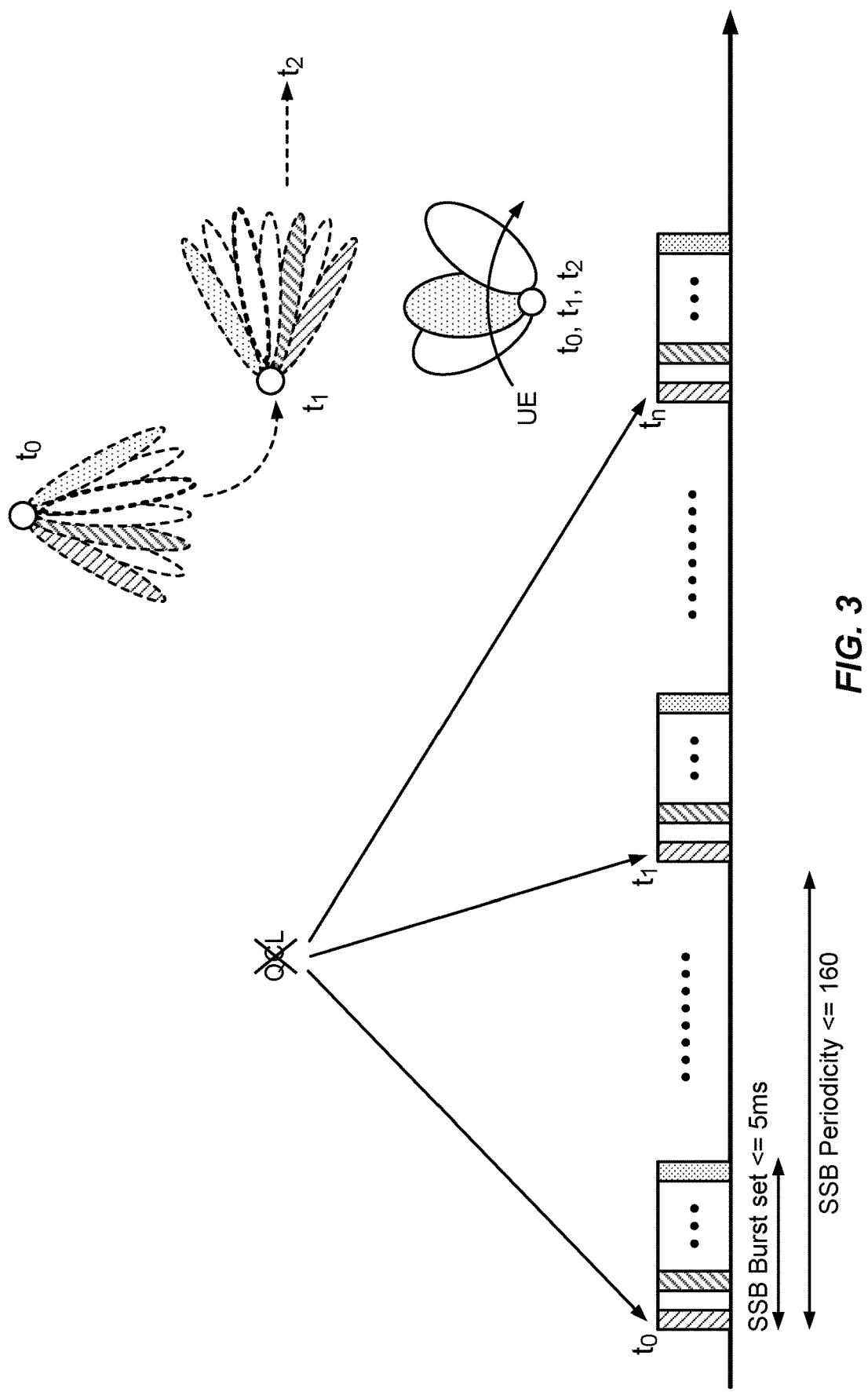
FIG. 3 illustrates an example of a scenario in which an initial access procedure is performed to establish a communication link between nodes using a proposed mobile-to-mobile beam management approach.

This is illustrated in FIG. 3. Unlike the situation in FIG. 1 in which the gNB is stationary, the gNB in FIG. 3 is mobile, meaning that the SSB transmitter (gNB) is not stationary anymore and the antenna array orientation or position may change over time. From the perspective of the gNB, the same beam is used to carry the same SSB(k) at each SSB burst time tn. For example, the SSB(0) is carried by the first beam at time t0 and at time t1.

However, from the perspective of the UE, because the gNB has moved, SSB(k) at time t0 can be entirely different from SSB(k) at time t1. That is, parameters such as Doppler spread, Doppler shift, average gain, average delay, delay spread, and, spatial Rx parameters of the same SSB(k) may take on different values at times t0 and t1. In short, when the gNB is mobile, QCL cannot be assumed. Then under certain mobility conditions, spatial RX beam parameters should not be considered QCLed for future RX or TX beam directions.

To address issues associated with mobile gNBs, a mobile-to-mobile beam management is proposed. It is recognized that in mobile scenarios such as in V2V communications, a vehicle may, in one instance, serve as the gNB acting to manage the communication resources, and may, in another instance, act like a UE being served by an acting gNB. Therefore, to capture that the same device can be capable of acting in both ways, terms synchronization signal block (SSB) transmitter and synchronization signal block (SSB) receiver will be used. Also terms transmitter-to-receiver (T2R) and receiver-to-transmitter (R2T) will be used to refer to the directions of the beams.

Figure 4:
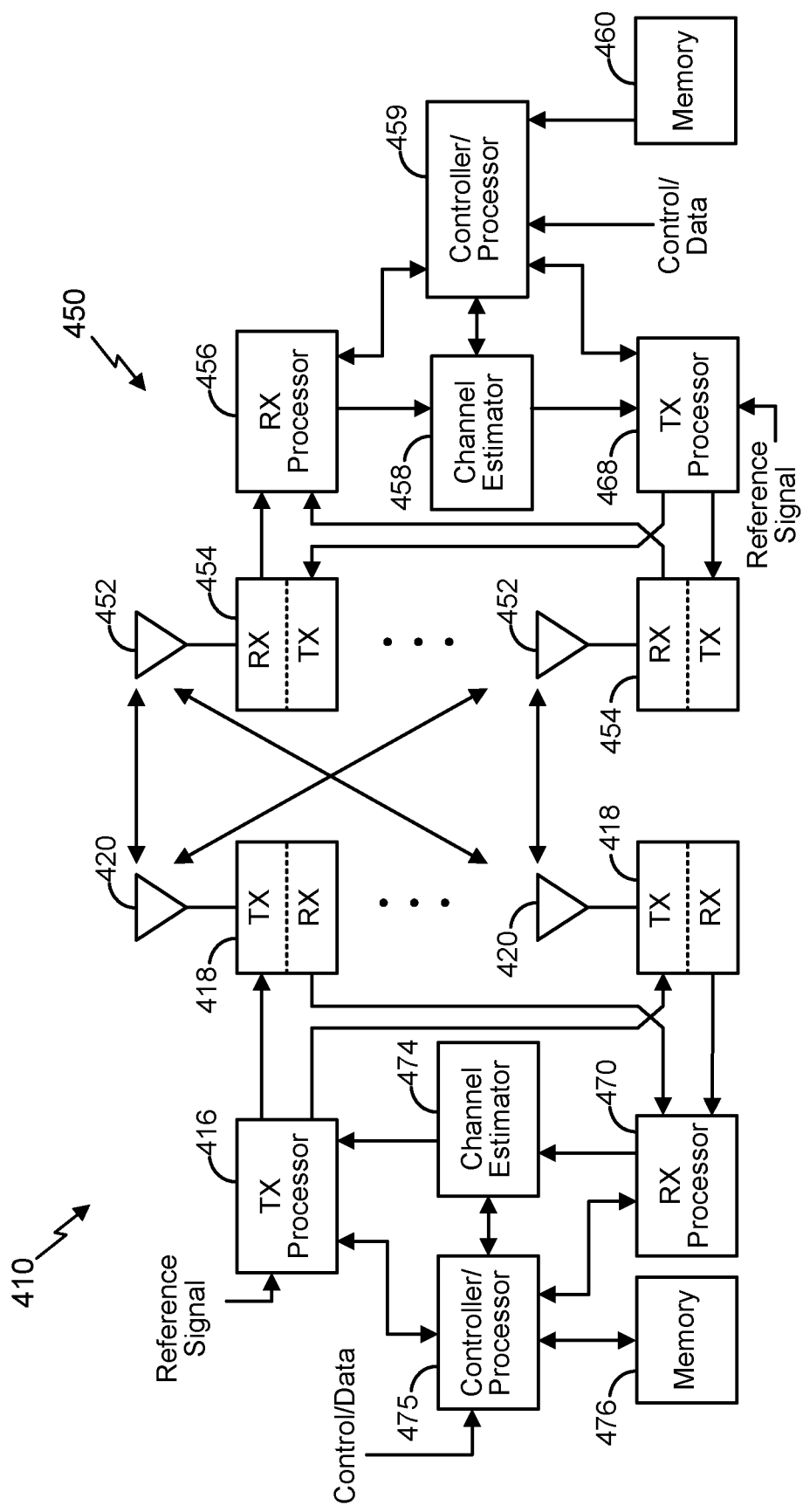
FIG. 4 illustrates an exemplary synchronization signal block transmitter and a synchronization signal block receiver, according to various aspects.

According to various aspects, FIG. 4 illustrates an exemplary SSB transmitter 410 in communication with an exemplary SSB receiver 450. Internet Protocol (IP) packets may be provided to a controller/processor 475. The controller/processor 475 implements functionality for a radio resource control (RRC) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for SSB receiver measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 416 and the receive (RX) processor 470 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and multiple-input and multiple-output (MIMO) antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the SSB receiver 450. Each spatial stream may then be provided to one or more different antennas 420 via a separate transmitter 418TX. Each transmitter 418TX may modulate an RF carrier with a respective spatial stream for transmission.

At the SSB receiver 450, each receiver 454RX receives a signal through its respective antenna 452. Each receiver 454RX recovers information modulated onto an RF carrier and provides the information to the RX processor 456. The TX processor 468 and the RX processor 456 implement Layer-1 functionality associated with various signal processing functions. The RX processor 456 may perform spatial processing on the information to recover any spatial streams destined for the SSB receiver 450. If multiple spatial streams are destined for the SSB receiver 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the SSB transmitter 410. These soft decisions may be based on channel estimates computed by the channel estimator 458. The soft decisions are then decoded and de-interleaved to recover the data and control signals that were originally transmitted by the SSB transmitter 410 on the physical channel. The data and control signals are then provided to the controller/processor 459, which implements Layer-3 and Layer-2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the core network. The controller/processor 459 is also responsible for error detection.

Similar to the functionality described in connection with the T2R transmission by the SSB transmitter 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 458 from a reference signal or feedback transmitted by the SSB transmitter 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the SSB transmitter 410 in a manner similar to that described in connection with the receiver function at the SSB receiver 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the SSB receiver 450. IP packets from the controller/processor 475 may be provided to the core network. The controller/processor 475 is also responsible for error detection.

In the SSB receiver 450, the transmitter 454TX and the receiver 454RX may together form a transceiver 454. In the SSB transmitter 410, the transmitter 418TX and the receiver 418RX may together form a transceiver 418.

The SSB transmitter 410 and the SSB receiver 450 may be configured to implement the proposed mobile-to-mobile beam management approach. In this approach, the SSB transmitter transmits a plurality of SSBs in an SSB burst through beam sweeping similar to as described above with respect to FIGS. 1 and 2. However, the proposed SSB transmitter 410 has an additional capability to receive PRACH preambles through a receive (RX) beam associated with a different transmit (TX) beam direction than the one used to transmit the SSB corresponding to the received PRACH preamble. This allows the SSB transmitter to transmit random access responses (RARs) in different TX beam directions as well.

Figure 5:
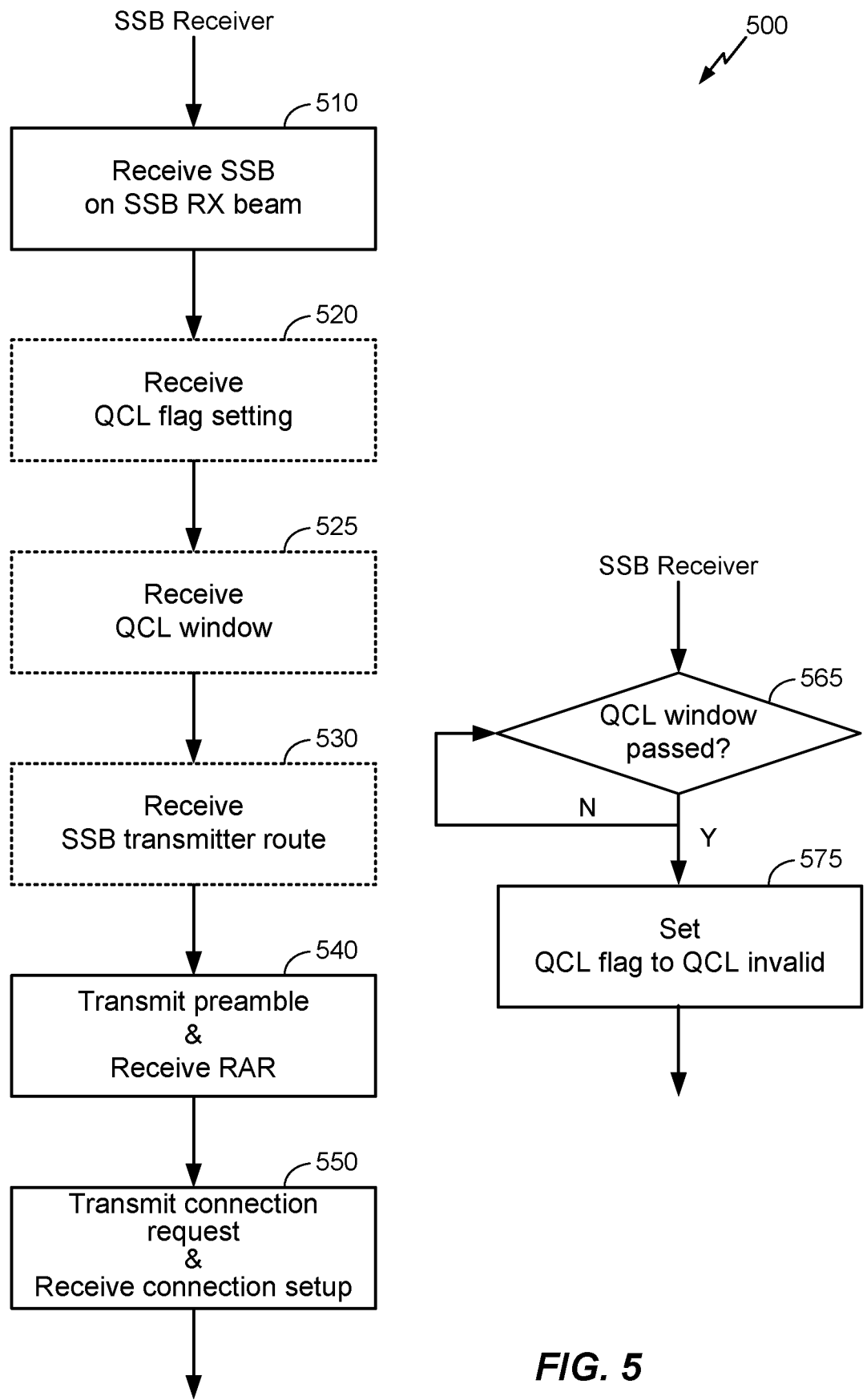
FIG. 5 illustrates a flow chart of an exemplary method performed by a synchronization signal block receiver to implement mobile-to-mobile beam management approach, according to various aspects.

FIG. 5 illustrates an exemplary method 500 performed by an SSB receiver (such as the SSB receiver 450) in mobile-to-mobile beam management while communicating with an SSB transmitter (such as the SSB transmitter 410). In the method, it is assumed that the SSB transmitter is mobile. The SSB receiver may also be mobile.

At block 510, the SSB receiver (specifically, transceiver 454 and/or RX processor 456 and/or controller/processor 459) may receive an SSB on a SSB receive (RX) beam from the SSB transmitter. Since the SSB RX beam is from the SSB transmitter, it may be viewed as a transmitter-to-receiver (T2R) beam in a particular T2R direction. The SSB may include an SSB index that corresponds to the SSB RX beam. In an aspect, receiving the SSB may comprise receiving one or more SSBs in corresponding one or more T2R beams transmitted from the SSB transmitter, and choosing the SSB of the best T2R beam. For example, the SSB transmitter may transmit a plurality of SSBs, each being uniquely identifiable (e.g., by an SSB index), in corresponding plurality T2R beams in an SSB burst. That is, each SSB may correspond with each T2R beam transmitted from the SSB transmitter. The SSB receiver (specifically, transceiver 454 and/or RX processor 456 and/or channel estimator 458 and/or controller/processor 459) may detect one or more of the transmitted T2R beams from the SSB transmitter, and choose the beam with the highest reference signal received power (RSRP), signal to interference and noise ratio (SINR), etc. as the SSB RX beam.

Optionally at block 520, the SSB receiver (specifically, transceiver 454 and/or RX processor 456 and/or controller/ processor 459) may receive a QCL flag setting from the SSB transmitter, in which instance, the SSB receiver may set a QCL flag accordingly. The QCL flag may indicate whether or not a QCL assumption is valid or not, i.e., whether or not it can be assumed that the transmissions from the SSB transmitter are QCLed. For example, even though the SSB transmitter is mobile, the SSB transmitter may not always be moving. When the SSB transmitter is moving, QCL should not be assumed. On the other hand, if the SSB transmitter stationary, it may be ok to assume that QCL holds. Thus, in an aspect, the SSB transmitter may indicate in the QCL flag setting whether the QCL assumption is valid (QCL valid) or not (QCL invalid) depending on whether the SSB transmitter itself is stationary or moving. The QCL flag may be set in accordance with the QCL flag setting.

The QCL flag setting may be included in the SSB received at block 510. Alternatively or in addition thereto, the QCL flag setting may be included as part of an alternative signaling such as in a remaining minimum system information (RMSI) received from the SSB transmitter and/or in other system information (OSI) received from the SSB transmitter. Also alternatively or in addition thereto, the QCL flag setting may be preconfigured within the SSB receiver, i.e., the QCL flag may be preset within SSB receiver to either QCL valid or QCL invalid. Even when preset, the QCL flag may be overridden with the QCL flag setting from the SSB transmitter.

Also optionally at block 525, the SSB receiver (specifically, transceiver 454 and/or RX processor 456 and/or controller/processor 459) may receive a QCL window from the SSB transmitter. The QCL window may indicate a duration in which the QCL may be assumed to be valid (e.g., indicate a duration that the QCL flag remains set to QCL valid). Recall from above that the SSB transmitter may be in motion, which in most instance, may lead to the QCL assumption being invalid. However, if the SSB transmitter is moving slowly, the QCL assumption still may be valid, at least for a finite period of time. In this instance, when the QCL flag is set to QCL valid during the QCL window, the SSB receiver may set the QCL flag to QCL invalid thereafter.

The QCL window may be included in the SSB received at block 510. Alternatively or in addition thereto, the QCL window may be included as part of an alternative signaling such as in a remaining minimum system information (RMSI) received from the SSB transmitter and/or in other system information (OSI) received from the SSB transmitter. Also alternatively or in addition thereto, the QCL window may be preconfigured within the SSB receiver, the duration of which may be overridden with the QCL window from the SSB transmitter.

As indicated above, the QCL assumption may be temporary. In such instances, the SSB receiver may set the QCL flag to invalid after the QCL window has passed since the QCL flag was previously set to QCL valid (e.g., as a result of receiving QCL valid in block 520). For example, the SSB receiver may perform blocks 565 and 575 whenever the QCL flag is set to QCL valid (indicating the QCL assumption can be made). At block 565, the SSB receiver may determine whether or not the QCL window has passed since the QCL flag has been set to QCL valid. If so, the SSB receiver may set the QCL flag to QCL invalid at block 575. If not, the block 565 may be repeated. It should be noted that blocks 565 and 575 can be performed whenever the QCL flag is set to QCL valid.

For descriptive purposes, the QCL flag and the QCL duration, while related, may be treated as different concepts. However, in practice, they may be implemented as one unit, e.g., QCL flag may be incorporated into QCL window where different bit combinations represent different durations in which the QCL may be assumed. For example, a particular combination representing a zero length QCL window (e.g., all bits are logical 0's) can be said to be equivalent to QCL flag being set to QCL invalid. Another bit combination representing an infinity length QCL window (e.g., all bits are logical 1's) can be said to be equivalent to the QCL flag being set to QCL valid. All other bit combination may represent finite length QCL windows. In an aspect, each bit combination may map to particular duration (e.g., in a table lookup), which may be preconfigured within the SSB receiver and/or may be received from the SSB transmitter.

Further optionally at block 530, the SSB receiver (specifically, transceiver 454 and/or RX processor 456 and/or controller/processor 459) may receive SSB transmitter path route from the SSB transmitter. The SSB transmitter path route allows the SSB receiver to estimate the location of the SSB transmitter, which can be advantageous as will be shown further below. The SSB transmitter path route may be included in the SSB received at block 510. Alternatively or in addition thereto, the SSB transmitter path route may be included as part of an alternative signaling such as in the RMSI received from the SSB transmitter and/or in the OSI received from the SSB transmitter.

Figure 6:
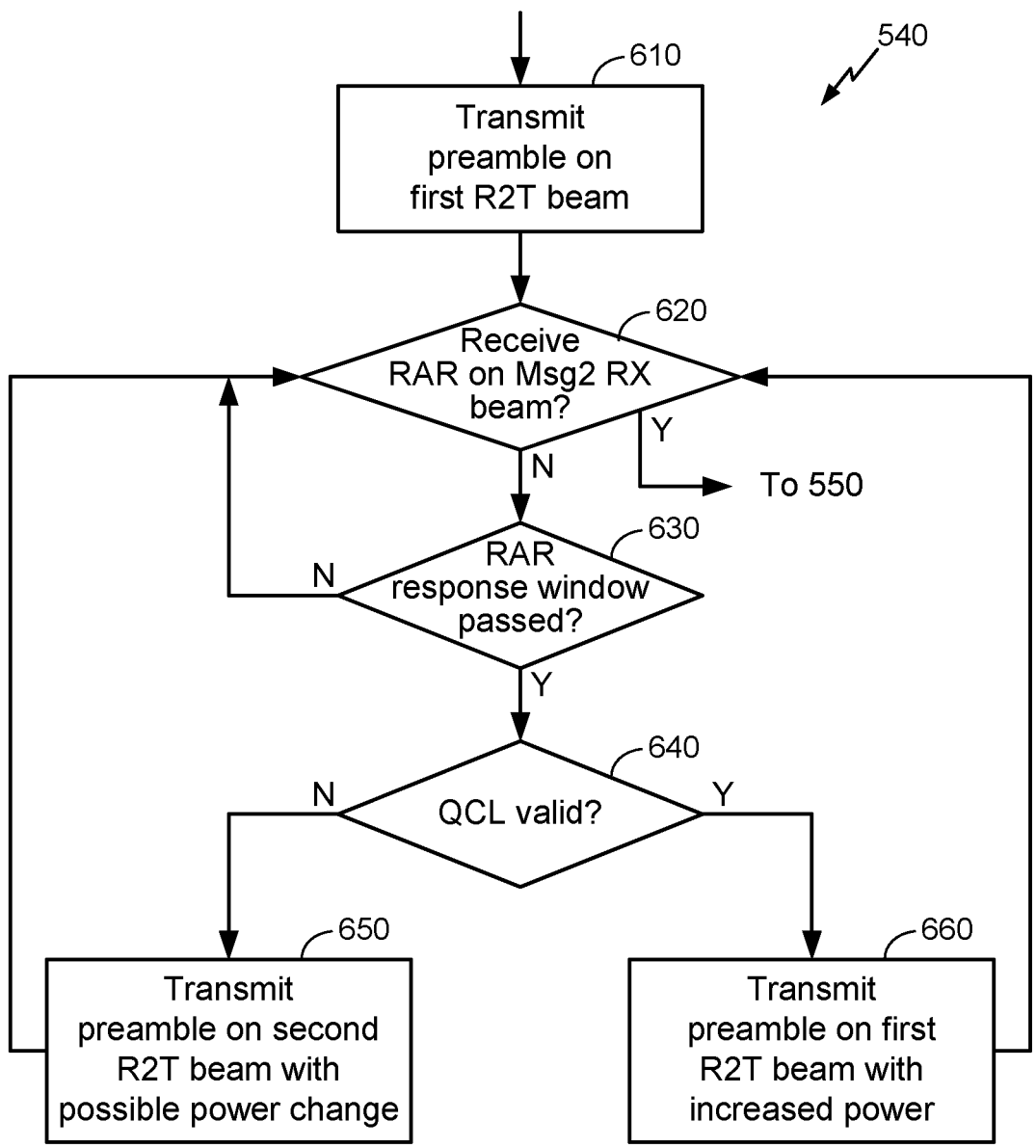
FIG. 6 illustrates a flow chart of an exemplary process performed by a synchronization signal block receiver for transmitting preambles and receiving random access responses, according to various aspects.

At block 540, the SSB receiver may transmit physical random access channel (PRACH) preamble to the SSB transmitter, and receive a random access response (RAR) from the SSB transmitter. FIG. 6 illustrates an example process performed by the SSB receiver to implement block 540. At block 610, the SSB receiver (specifically, TX processor 468 and/or transceiver 454 and/or controller/processor 459) may transmit the PRACH preamble on a first receiver-to-transmitter (R2T) beam in a first R2T direction to the SSB transmitter. That is, Msg1 may be transmitted on the first R2T beam. The first R2T beam may be aligned with the SSB RX beam on which the SSB is received. In an aspect, the first R2T beam may be aligned with the SSB RX beam even when the QCL flag is set to QCL invalid. The PRACH preamble may be based on the SSB. Since each SSB corresponds each of the T2R beams from the SSB transmitter, the PRACH preamble being based on the SSB enables the SSB transmitter to identify the particular T2R beam carrying the SSB received by the SSB receiver.

From the SSB receiver's perspective, after transmitting the PRACH preamble (e.g., Msg1), the SSB receiver then expects to receive the RAR (Msg2). The RAR may be received in a Msg2 RX beam, which may be in a second T2R direction. It should be noted that the SSB RX and Msg2 RX beams may be the same or different. At block 620, the SSB receiver (specifically, RX processor 456 and/or controller/processor 459) may determine whether or not the RAR has been received from the SSB transmitter, e.g., on the Msg2 RX beam in the second T2R direction. That is, the SSB receiver may determine whether or not Msg2 has been received. If not (N branch from block 620), then at block 630, the SSB receiver (specifically, controller/processor 459) may determine whether or not RAR response window duration has passed since a previous transmission of the PRACH preamble from the SSB receiver. This means that when the process reaches block 630 through block 610, it is determined whether or not the RAR response window has passed since transmitting the PRACH preamble on the first T2R beam. If the RAR response window has not passed (N branch from block 630), then the process may return to block 620.

On the other hand, if the RAR response window has passed (Y branch from block 630), then at block 640, the SSB receiver (specifically, controller/processor 459) may determine whether or not the QCL flag is set to QCL valid, i.e., determine whether the QCL may be assumed for transmissions from the SSB transmitter. Recall from above that at block 520, the QCL flag setting may be received from the SSB transmitter included in the SSB itself and/or as part of an alternative signaling (e.g., RMSI, OSI). Thus, in one aspect, the QCL flag may be set according to the received QCL setting. Alternatively or in addition thereto, the QCL flag may be statically preconfigured in the SSB receiver (to QCL valid or QCL invalid). Note that the preconfigured QCL flag setting may be overridden by the QCL flag setting from the SSB transmitter. Also, if the QCL flag is set as QCL valid (whether preconfigured or from QCL flag setting from the SSB transmitter), the QCL flag may be set as QCL invalid after the QCL window time passes. In yet another alternative, the SSB receiver may be configured to behave as if the QCL flag is set to QCL invalid.

If the QCL flag is set to QCL valid (Y branch from block 640), then at block 660, the SSB receiver (specifically, TX processor 468 and/or transceiver 454 and/or controller/processor 459) may behave conventionally by retransmitting the PRACH preamble on the same R2T beam previously used but with increased power. In other words, if the QCL assumption is valid (e.g., if QCL valid) and the RAR is not received within the RAR response window subsequent to previously transmitting the PRACH preamble on the first R2T beam, the SSB receiver may retransmit the PRACH preamble on the first R2T beam with increased power. Again, the first R2T beam may be aligned with the SSB RX beam.

On the other hand, if the QCL flag is set to QCL invalid (N branch from block 640), then at block 650, the SSB receiver (specifically, TX processor 468 and/or transceiver 454 and/or controller/processor 459) may transmit the PRACH preamble to the SSB transmitter on an R2T beam different from the R2T beam previously used. The process then may proceed back to block 620. Generally, the SSB receiver may transmit the PRACH preamble on the second R2T beam when the QCL assumption is not valid (e.g., when QCL flag is set to QCL invalid) and the RAR is not received within the RAR response window subsequent to transmitting the PRACH preamble on the first R2T beam. In an aspect, the transmission power of the PRACH preamble on the different second R2T beam may be adjusted based on a reference signal received power (RSRP) from the SSB transmitter.

It is thus seen that if the SSB receiver does not receive the RAR within the RAR response window after the PRACH preamble is transmitted on the first R2T beam at block 610, the SSB receiver may iterate through blocks 620, 630, 640, and 650 at least once before receiving the RAR from the SSB transmitter. When the SSB receiver does receive the RAR on the Msg2 RX beam at block 620 after one or more iterations, this means that the SSB transmitter received the PRACH preamble transmitted on one of the different R2T beams—a second R2T beam in a second R2T direction—transmitted from the SSB receiver. The second R2T direction (of the second R2T beam carrying Msg1) may be different from the first R2T direction (of the first R2T beam also carrying Msg1). Also, the second R2T beam may not be aligned with the first T2R beam (carrying the SSB) received at block 510.

Figure 7:
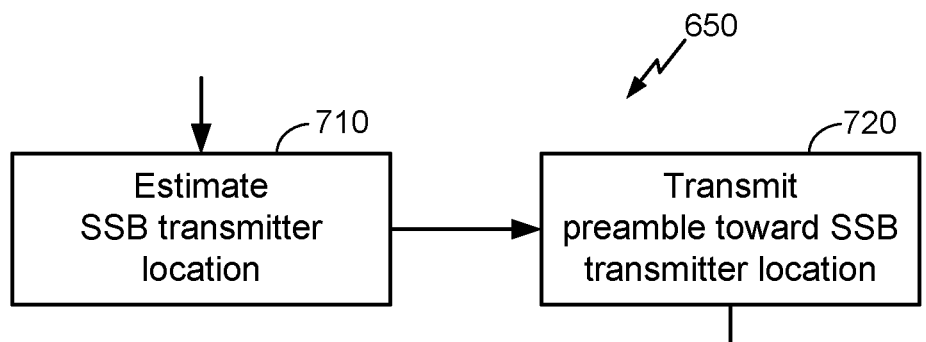
FIG. 7 illustrates a flow chart of an exemplary process performed by a synchronization signal block receiver for estimating a location of a synchronization signal block transmitter and transmitting preambles in a direction towards a synchronization signal block transmitter.

In one aspect, the SSB receiver at block 650 may simply sequence through a plurality of R2T beams in transmitting the PRACH preamble (Msg1) to the SSB transmitter. Alternatively or in addition thereto, the SSB receiver may choose the direction of transmission at block 650. FIG. 7 illustrates an example process performed by the SSB receiver to implement block 650. Recall that at block 530, the SSB receiver may receive the SSB transmitter path route. Then at block 710, the SSB receiver (specifically, controller/processor 459) may estimate the location of the SSB transmitter based on the SSB transmitter path route. At block 720, the second R2T direction may be determined such that the second R2T beam is transmitted towards the estimated location of the SSB transmitter.

At block 620, when the RAR is received, it is received on the Msg2 RX beam in the second T2R direction. Since the SSB transmitter is mobile, the first T2R direction (of the SSB RX beam carrying the SSB) may be different from the second T2R direction (of the Msg2 RX beam carrying the RAR). This may be particularly true when the QCL cannot be assumed, i.e., when the QCL flag is set to QCL invalid.

Figure 8:
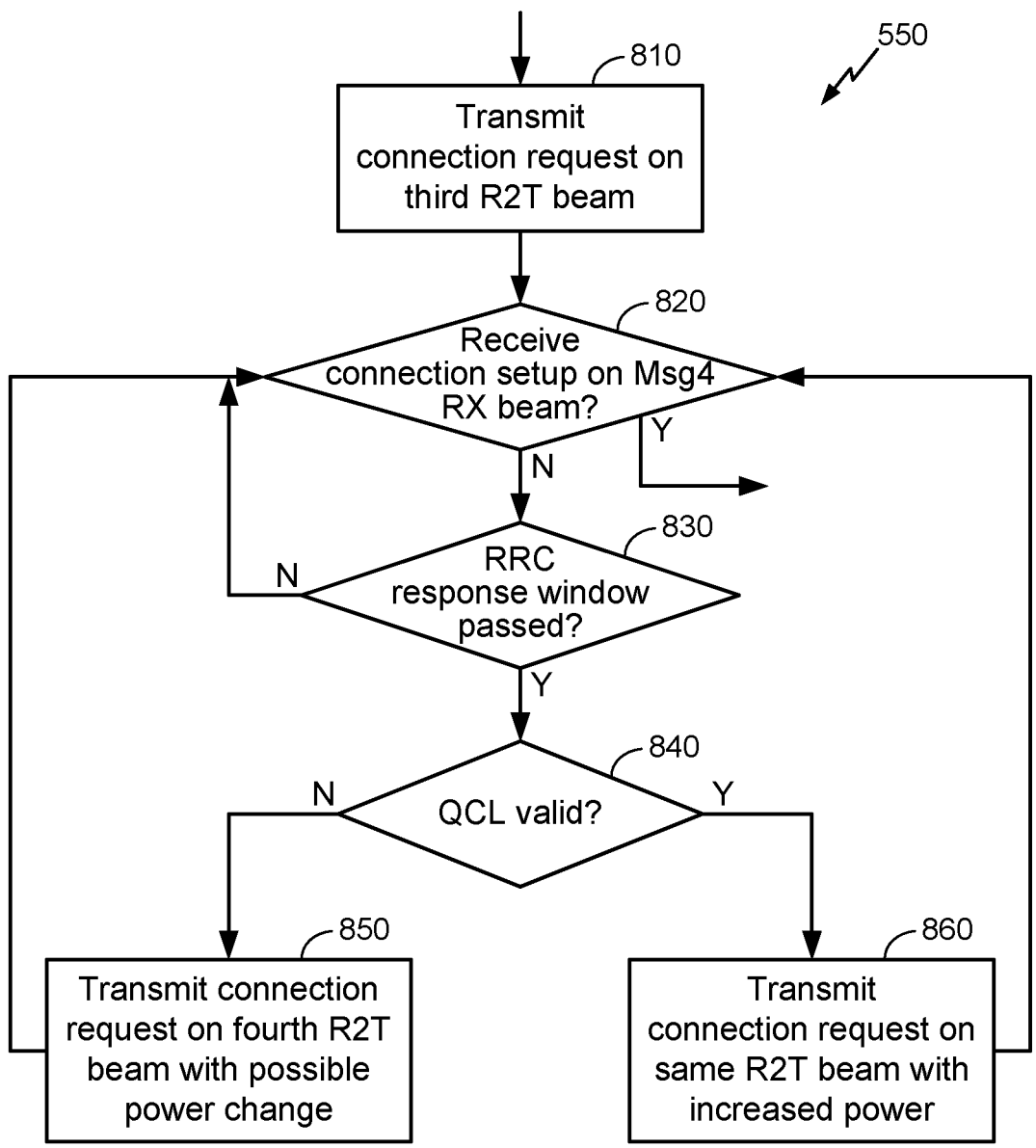
FIG. 8 illustrates a flow chart of an exemplary process performed by a synchronization signal block receiver for transmitting connection requests and receiving connection setups, according to various aspects.

When the RAR is received at block 620, then the SSB receiver may proceed to block 550 in FIG. 5 in which the SSB receiver may transmit a connection request (e.g., radio resource control (RRC) connection request) to the SSB transmitter and receive a connection setup (RRC connection setup) from the SSB transmitter. FIG. 8 illustrates an example process performed by the SSB receiver to implement block 550. At block 810, the SSB receiver (specifically, TX processor 468 and/or transceiver 454 and/or controller/processor 459) may transmit the RRC connection request on a third R2T beam in a third R2T direction to the SSB transmitter. That is, Msg3 may be transmitted on the third R2T beam. In an aspect, the transmission power of the RRC connection request on the third R2T beam may be adjusted based on the RSRP from the SSB transmitter. The third R2T direction (of the third R2T beam carrying Msg3) may be different from the first R2T direction (of the first R2T beam carrying Msg1) and/or the second R2T direction (of the second R2T beam also carrying Msg1). The third R2T beam may be aligned with the Msg2 RX beam. In an aspect, the third R2T beam may be aligned with the Msg2 RX beam even when the QCL flag is set to QCL invalid. The RRC connection request may be based on the RAR.

At block 820, the SSB receiver (specifically, RX processor 456 and/or controller/processor 459) may determine whether or not the RRC connection setup has been received from the SSB transmitter on a Msg4 RX beam in a third T2R direction. That is, the SSB receiver may determine whether or not Msg4 has been received. If not (N branch from 820), then at block 830, the SSB receiver (specifically, controller/processor 459) may determine whether or not RRC response window duration has passed since a previous transmission of the RRC connection request. This means that when the process reaches 830 through 810, it is determined whether or not the RRC response window has passed since transmitting the RRC connection request on the third R2T beam. If the RRC response window duration has not passed (N branch from 830), then the process may return to 820.

On the other hand, if the RRC response window duration has passed (Y branch from 830), then at block 840, the SSB receiver (specifically, controller/processor 459) may determine whether or not the QCL flag is set to QCL valid, i.e., determine whether the QCL may be assumed for transmissions from the SSB transmitter. Recall that the QCL flag value may change to QCL invalid if the QCL window has passed. If the QCL flag is set to QCL valid (Y branch from 840), then at block 860, the SSB receiver (specifically, TX processor 468 and/or transceiver 454 and/or controller/ processor 459) may retransmit the RRC connection request on the same R2T beam previously used but with increased power. In other words, if the QCL assumption is valid and the RRC connection setup is not received within the RRC response window duration subsequent to previously transmitting the RRC connection request on the third R2T beam, the SSB receiver may retransmit the RRC connection request on the third R2T beam with increased power. The third R2T beam may be aligned with the Msg RX beam.

On the other hand, if the QCL flag is set to QCL invalid (N branch from 840), then at block 850, the SSB receiver (specifically, TX processor 468 and/or transceiver 454 and/or controller/processor 459) may transmit the RRC connection request to the SSB transmitter on a R2T beam different from the R2T beam previously used. The process then may proceed back to 820. Generally, the SSB receiver may transmit the RRC connection request on the different R2T beam when the QCL assumption is not valid (e.g., when QCL flag is QCL invalid) and the RRC connection setup is not received within the RRC response window subsequent to transmitting the RRC connection request on the third R2T beam. In an aspect, the transmission power of the RRC connection request on the different R2T beam may be adjusted based on the RSRP from the SSB transmitter.

It is thus seen that if the SSB receiver does not receive the RRC connection setup within the RRC response window duration after the RRC connection request is transmitted on the third R2T beam at block 810, the SSB receiver may iterate through 820, 830, 840, and 850 at least once before receiving the RRC connection setup from the SSB transmitter. When the SSB receiver does receive the RRC connection setup on the Msg4 RX beam at block 820 after one or more iterations, this means that the SSB transmitter received the RRC connection request transmitted on one of the different R2T beams—a fourth R2T beam in a fourth R2T direction—transmitted from the SSB receiver. The fourth R2T direction (of the fourth R2T beam carrying Msg3) may also be different from the third R2T direction (of the third R2T beam also carrying Msg3). Also, the fourth R2T beam may not be aligned with the Msg2 RX beam (carrying the RAR) received at block 620.

Figure 9:
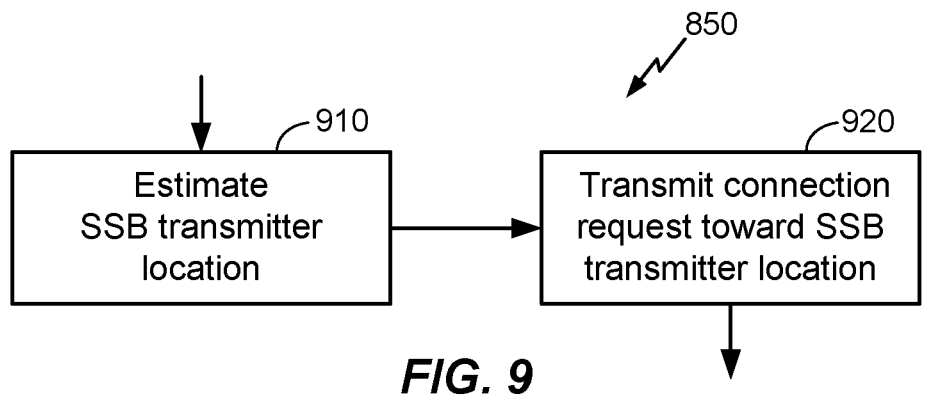
FIG. 9 illustrates a flow chart of an exemplary process performed by a synchronization signal block receiver for estimating a location of a synchronization signal block transmitter and transmitting connection requests in a direction towards a synchronization signal block transmitter, according to various aspects.

In one aspect, the SSB receiver at block 850 may simply sequence through the plurality of R2T beams in transmitting the RRC connection request (Msg3) to the SSB transmitter. Alternatively or in addition thereto, the SSB receiver may choose the direction of transmission at block 850. FIG. 9 illustrates an example process performed by the SSB receiver to implement block 850. At block 910, the SSB receiver (specifically, controller/processor 459) may estimate the location of the SSB transmitter based on the SSB transmitter path route (received at block 530). At block 920, the fourth R2T direction may be determined such that the fourth R2T beam is transmitted towards the estimated location of the SSB transmitter.

At block 820, when the RRC connection setup is received, it is received on the Msg3 RX beam in a third T2R direction. Since the SSB transmitter is mobile, the second T2R direction (of the Msg2 RX beam carrying the RAR) may be different from the third T2R direction (of the Msg4 RX beam carrying the RRC connection setup). This may be particularly true when the QCL cannot be assumed, i.e., when the QCL flag is set to QCL invalid.

Figure 10:
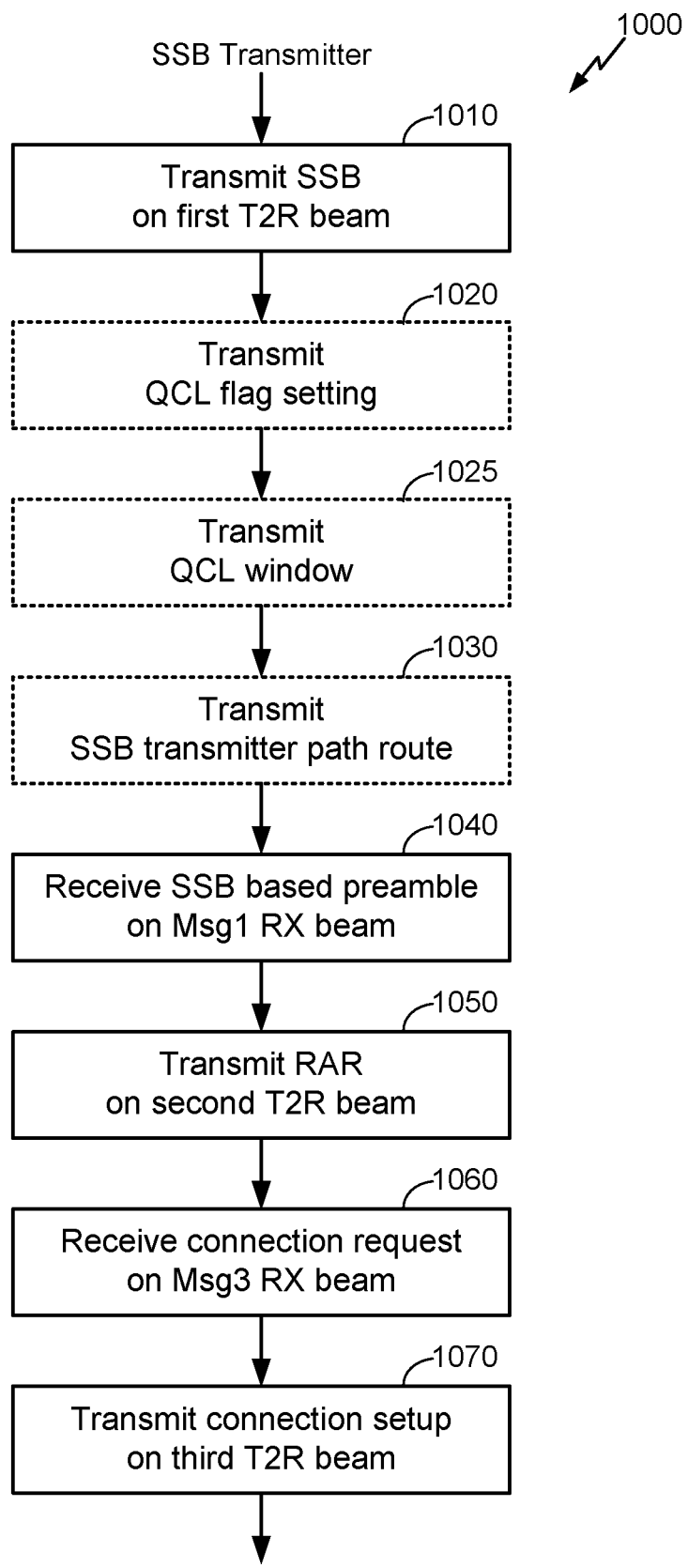
FIG. 10 illustrates an exemplary method performed by a synchronization signal block transmitter to implement mobile-to-mobile beam management approach, according to various aspects.

FIG. 10 illustrates an exemplary method 1000 performed by an SSB transmitter (such as the SSB transmitter 410) in mobile-to-mobile beam management while communicating with an SSB receiver (such as the SSB receiver 450). In the method, it is assumed that the SSB transmitter is mobile. The SSB receiver may also be mobile.

At block 1010, the SSB transmitter (specifically, transceiver 418 and/or TX processor 416 and/or controller/processor 475) may transmit an SSB on a first T2R beam in a first T2R direction to the SSB receiver. The SSB may include an SSB index that corresponds to the first T2R beam. In an aspect, the first T2R beam may be one of a plurality of T2R beams transmitted by the SSB transmitter in an SSB burst. Each T2R beam may carry an SSB with an SSB index corresponding to that T2R beam.

Optionally at block 1020, the SSB transmitter (specifically, transceiver 418 and/or TX processor 416 and/or controller/processor 475) may transmit a QCL flag setting of a QCL flag to indicate whether or not QCL may be assumed for transmissions from the SSB transmitter. For example, the SSB transmitter may set the QCL flag to indicate whether the QCL assumption is valid or not depending on whether the SSB transmitter is stationary or moving. The QCL flag setting may be included in the SSB transmitted at block 1010. Alternatively or in addition thereto, the QCL flag may be included as part of an alternative signaling such as in the RMSI transmitted from the SSB transmitter and/or in the OSI transmitted from the SSB transmitter.

Also optionally at block 1025, the SSB transmitter (specifically, transceiver 418 and/or TX processor 416 and/or controller/processor 475) may transmit a QCL window to the SSB receiver. As mentioned, the QCL window may indicate a duration in which the QCL may be assumed to be valid (e.g., indicate a duration that the QCL flag remains set to QCL valid). The QCL flag may be then set to QCL invalid thereafter (i.e., after the duration and/or QCL window expires). In an aspect, the SSB transmitted may be configured to determine the specific setting of QCL window as well as the QCL flag based on its current characteristics. For example, the QCL window and/or the QCL flag may be set based on the SSB transmitter's own expected translational rate and/or rotational rate (e.g., speed). In another aspect, the beam width of the beams may also be taken into account (e.g., longer QCL window for wider beam width). The QCL window may be included in the SSB transmitted at block 1010. Alternatively or in addition thereto, the QCL window may be included as part of an alternative signaling such as in the RMSI transmitted from the SSB transmitter and/or in the OSI transmitted from the SSB transmitter.

Further optionally at block 1030, the SSB transmitter (specifically, transceiver 418 and/or TX processor 416 and/or controller/processor 475) may transmit the SSB transmitter path route. The SSB transmitter path route may be included in the SSB transmitted at block 1010. Alternatively or in addition thereto, the SSB transmitter path route may be included as part of an alternative signaling such as in the RMSI transmitted from the SSB transmitter and/or in the OSI transmitted from the SSB transmitter.

Figure 11:
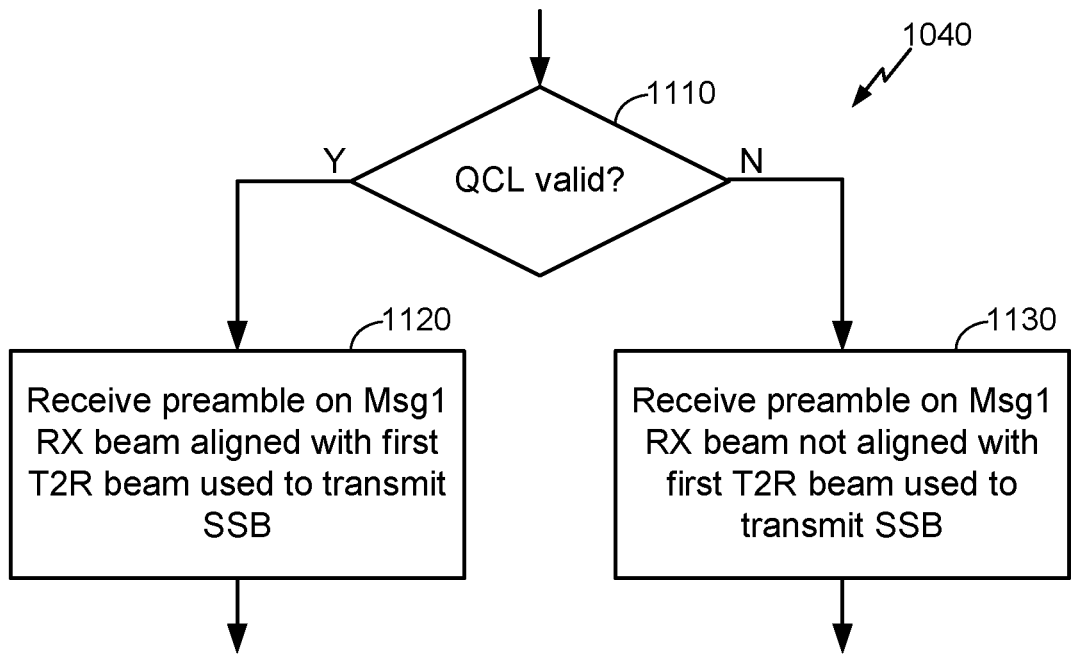
FIG. 11 illustrates a flow chart of an exemplary process performed by a synchronization signal block transmitter for receiving a preamble from a synchronization signal block receiver according to various aspects.

At block 1040, the SSB transmitter may receive the PRACH preamble on a Msg1 RX beam in a R2T direction from the SSB receiver. That is, Msg1 may be received on the R2T beam. The PRACH preamble may be based on, i.e., associated with, the SSB transmitted on the first TR2 beam. FIG. 11 illustrates an example process performed by the SSB transmitter to implement block 1040. At block 1110, the SSB transmitter (specifically, controller/processor 475) may determine whether or not the QCL flag is set to QCL valid, i.e., determine whether or not the QCL assumption is valid. If the QCL flag is set to QCL valid (Y branch from 1110), then at block 1120, the SSB transmitter (specifically, RX processor 470 and/or transceiver 418 and/or controller/ processor 475) may receive the PRACH preamble on the Msg1 RX beam that is aligned with the first T2R beam used to transmit the SSB.

If the QCL flag is set to QCL invalid (N branch from 1110), then at block 1130, the SSB transmitter (specifically, RX processor 470 and/or transceiver 418 and/or controller/processor 475) may receive the PRACH preamble of the Msg1 RX beam that is not aligned with the first T2R beam. For example, the SSB transmitter (specifically, RX processor 470 and/or transceiver 418 and/or controller/processor 475) may search for the preamble associated with the SSB transmitted on the first T2R beam in one or more other R2T beams not aligned with the first T2R beam. Referring back to FIG. 10, when block 1040 is performed, the Msg1 RX beam may or may not be aligned with the first T2R beam. But regardless of whether the Msg1 RX beam is or is not aligned, the PRACH preamble may be based on the SSB transmitted on the first T2R beam. That is, the PRACH preamble carried on the Msg1 RX beam may be associated with the SSB corresponding to the first T2R beam.

Figure 12:
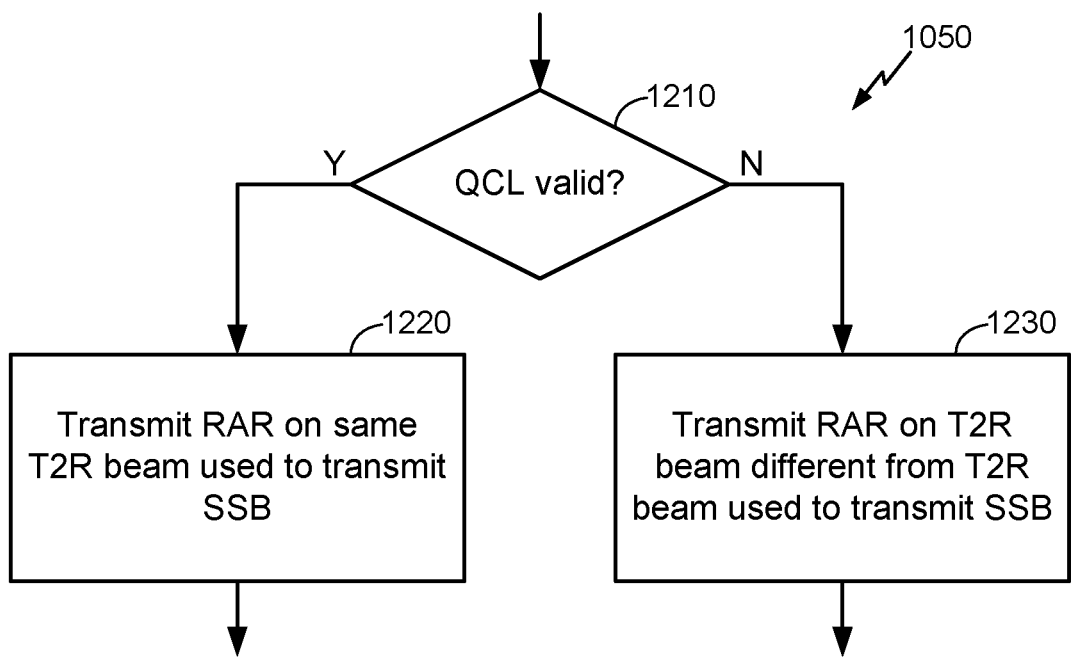
FIG. 12 illustrates a flow chart of an exemplary process performed by a synchronization signal block transmitter for transmitting a random access response to a synchronization signal block receiver according to various aspects.

At block 1050, in response to receiving the PRACH preamble, the SSB transmitter (specifically, transceiver 418 and/or TX processor 416 and/or controller/processor 475) may transmit the RAR to the SSB receiver on a second T2R beam in a second T2R direction. That is, Msg2 may be transmitted on the second T2R beam. FIG. 12 illustrates an example process performed by the SSB transmitter to implement block 1050. At block 1210, the SSB transmitter (specifically, controller/processor 475) may determine whether or not the QCL flag is set to QCL valid. If so, i.e., if the QCL assumption is valid (Y branch from 1210), then at block 1220, the SSB transmitter (specifically, TX processor 416 and/or transceiver 418 and/or controller/processor 475) may transmit the RAR on the same T2R beam used to transmit the SSB. In other words, the first and second T2R beams may be the same.

If the QCL flag is set to QCL invalid (N branch from 1210), then at block 1230, the SSB transmitter (specifically, transceiver 418 and/or TX processor 416 and/or controller/processor 475) may transmit the RAR on a T2R beam different from the T2R beam used to transmit the SSB. In other words, the first and second T2R beams may be different when QCL cannot be assumed. In an aspect, the SSB transmitter (specifically, TX processor 416 and/or controller/processor 475) may estimate the second T2R direction based on the SSB transmitter route path and the R2T direction of the Msg1 RX beam when the QCL flag is set to QCL invalid. The estimated second T2R direction may be such that the second T2R beam is transmitted towards a location of the SSB receiver.

Referring back to FIG. 10, when block 1050 is performed, the second T2R beam may be aligned with the Msg1 RX beam received at block 1040, which may (if QCL valid) or may not (if QCL invalid) be aligned with the first T2R beam. Also, the second T2R direction (of the second T2R beam) may be different from (if QCL invalid) or the same as (if QCL valid) the first T2R direction (of the first T2R beam).

At block 1060, the SSB transmitter may receive an RRC connection request from the SSB receiver on a Msg3 RX beam. For ease of reference, the R2T direction of the Msg1 RX beam on which the PRACH preamble is carried will be referred to as the first R2T direction. The R2T direction of the Msg3 RX beam will be referred to as the second R2T direction. It should be noted that the Msg1 and Msg3 RX beams may be the same or different. Then at block 1060, it may be said that the SSB transmitter may receive the RRC connection request from the SSB receiver on the Msg3 RX beam in the second R2T direction.

Figure 13:
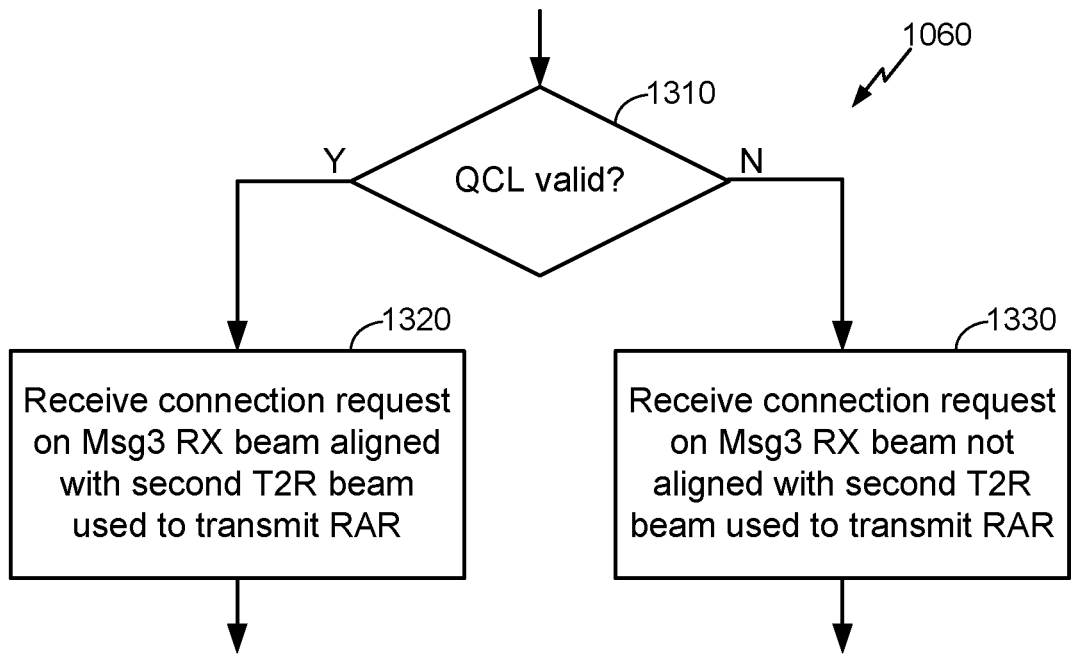
FIG. 13 illustrates a flow chart of an exemplary process performed by a synchronization signal block transmitter for receiving a connection request from a synchronization signal block receiver according to various aspects.

FIG. 13 illustrates an example process performed by the SSB transmitter to implement block 1060. At block 1310, the SSB transmitter (specifically, controller/processor 475) may determine whether or not the QCL flag is set to QCL valid. If so, i.e., if the QCL assumption is valid (Y branch from 1310), then at block 1320, the SSB transmitter (specifically, RX processor 470 and/or transceiver 418 and/or controller/processor 475) may receive the RRC connection request on the Msg3 RX beam that is aligned with the second T2R beam used to transmit the RAR.

If the QCL flag is set to QCL invalid (N branch from 1310), then at block 1330, the SSB transmitter (specifically, RX processor 470 and/or transceiver 418 and/or controller/processor 475) may receive the connection request on the Msg3 RX beam is not aligned with the second T2R beam. For example, the SSB transmitter (specifically, RX processor 470 and/or transceiver 418 and/or controller/processor 475) may search for the connection request associated with the RAR transmitted on the second T2R beam in one or more other R2T beams not aligned with the second T2R beam. Alternatively or in addition thereto, the SSB transmitter (specifically, RX processor 470 and/or transceiver 418 and/or controller/processor 475) may search for the connection request associated with the SSB transmitted on the first T2R beam in one or more other R2T beams not aligned with the first T2R beam.

Referring back to FIG. 10, when block 1060 is performed, the Msg3 RX beam may or may not be aligned with the second T2R beam, and also may or may not be aligned with the first T2R beam. But regardless of whether the Msg3 RX beam is or is not aligned, the PRACH preamble may be based on the SSB transmitted on the first T2R beam. That is, the connection request carried on the Msg3 RX beam may be associated with the SSB corresponding to the first T2R beam and/or with the RAR corresponding to the second T2R beam.

Figure 14:
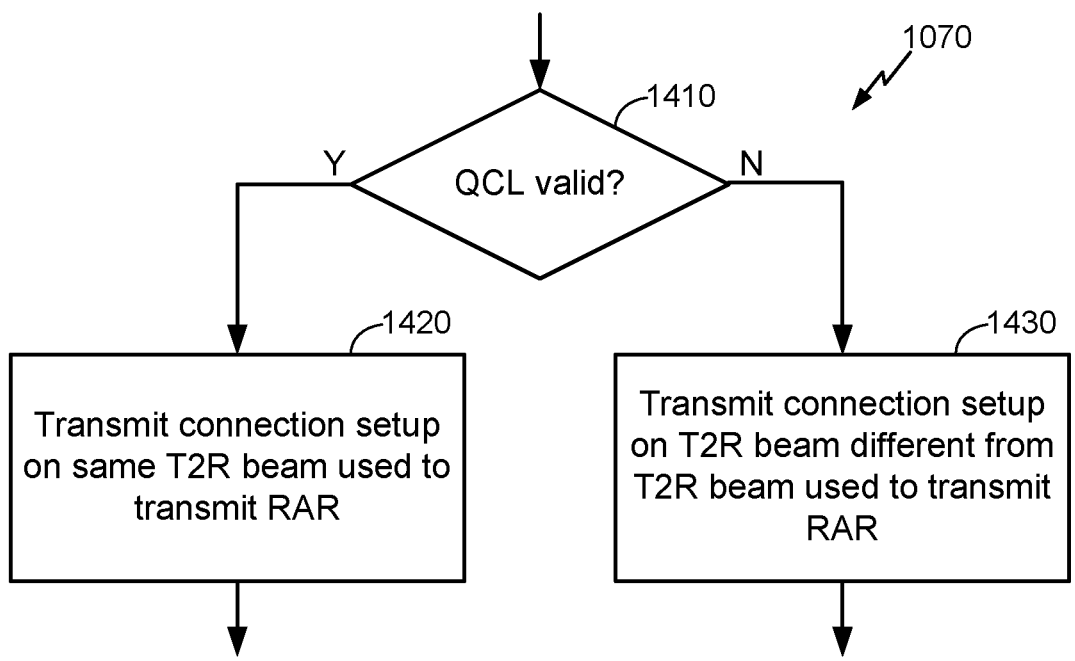
FIG. 14 illustrates a flow chart of an exemplary process performed by a synchronization signal block transmitter for transmitting a connection setup to a synchronization signal block receiver according to various aspects.

At block 1070, in response to receiving the RRC connection request, the SSB transmitter (specifically, transceiver 418 and/or TX processor 416 and/or controller/processor 475) may transmit the RRC connection setup to the SSB receiver on a third T2R beam in a third T2R direction. That is, Msg4 may be transmitted on the third T2R beam. FIG. 14 illustrates an example process performed by the SSB transmitter to implement block 1070. At block 1410, the SSB transmitter (specifically, controller/processor 475) may determine whether or not the QCL flag is set to QCL valid. If so, (Y branch from 1410), then at block 1420, the SSB transmitter (specifically, TX processor 416 and/or transceiver 418 and/or controller/processor 475) may transmit the connection setup on the same T2R beam used to transmit the RAR. In other words, the second and third T2R beams may be the same. It may also be that the first and third beams may be same (e.g., if QCL valid from the beginning).

If the QCL flag is set to QCL invalid (N branch from 1410), then at block 1430, the SSB transmitter (specifically, transceiver 418 and/or TX processor 416 and/or controller/processor 475) may transmit the connection setup on a T2R beam different from the beam used to transmit the RAR. In other words, the second and third T2R beams may be different when QCL cannot be assumed. The first and third T2R beams may also be different. In an aspect, the SSB transmitter (specifically, TX processor 416 and/or controller/processor 475) may estimate the third T2R direction based on the SSB transmitter route path and the R2T direction of the Msg3 RX beam when the QCL flag is set to QCL invalid.

The estimated third T2R direction may be such that the third T2R beam is transmitted towards the location of the SSB receiver.

When block 1070 is performed, the third T2R beam may be aligned with the Msg3 RX beam (carrying connection request) received at block 1060, which may or may not be aligned with the Msg1 RX beam (carrying preamble) received at block 1040. Also, the third T2R direction (of the third T2R beam carrying Msg4) may be different from or the same as the first T2R direction (of the first T2R beam carrying SSB) and/or different from or the same as the second T2R direction (of the second T2R beam carrying Msg2).

It should be noted that not all illustrated blocks of FIGS. 5-14 need be performed, i.e., some blocks may be optional. Also, the numerical references to the blocks in these figures should not be taken as requiring that the blocks should be performed in a certain order. Indeed, some blocks may be performed concurrently.

Figure 15:
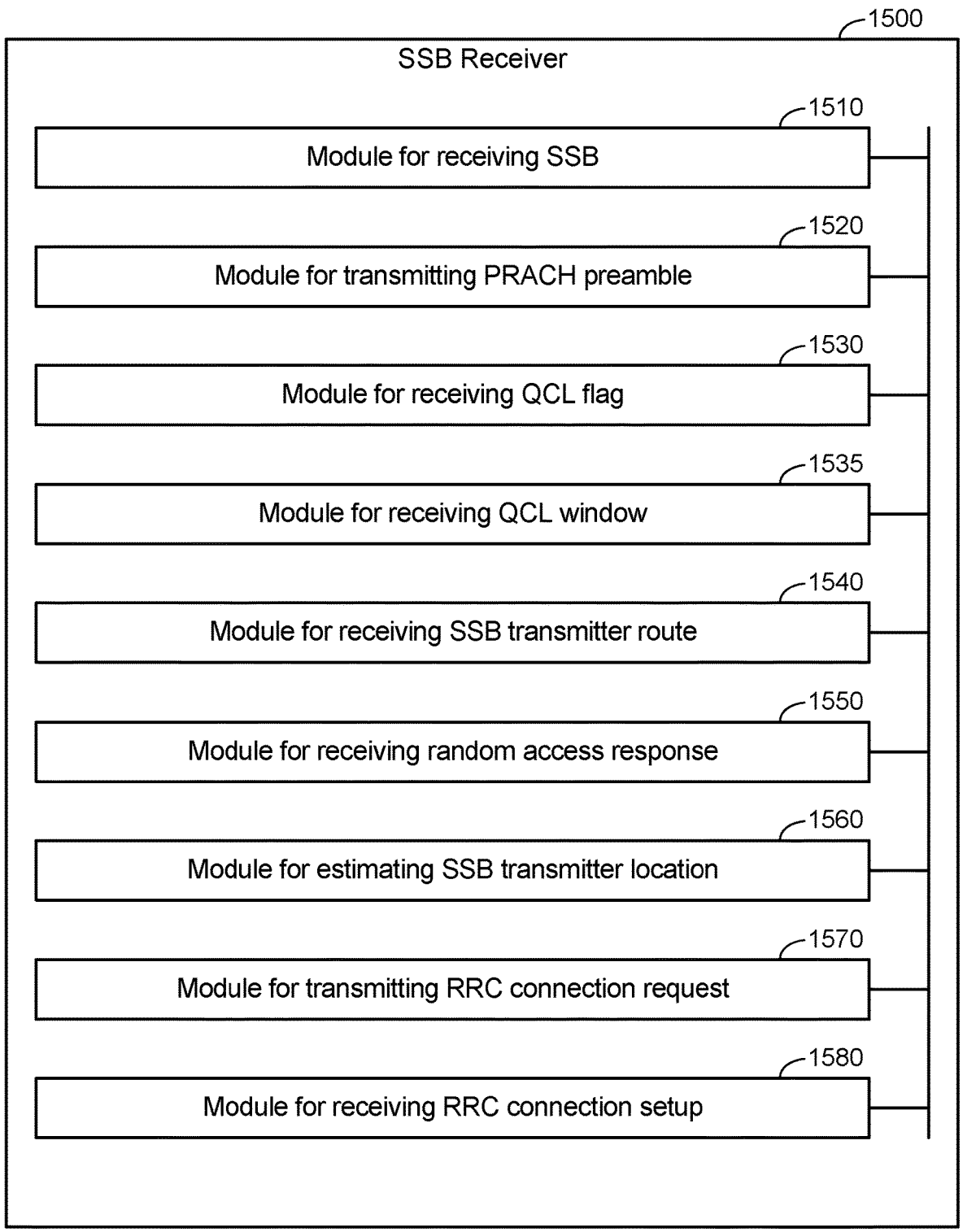
FIG. 15 illustrates a simplified block diagram of an example synchronization signal block receiver configured to implement mobile-to-mobile beam management approach, according to various aspects.

FIG. 15 illustrates an example SSB receiver 1500 represented as a series of interrelated functional modules connected by a common bus. A module for receiving an SSB 1510 may correspond at least to transceiver 454, RX processor 456, and controller/processor 459 of FIG. 4, as discussed herein. A module for transmitting PRACH preamble 1520 may correspond at least to transceiver 454, TX processor 468, and controller/processor 459 of FIG. 4, as discussed herein. A module for receiving QCL flag 1530 may correspond at least to transceiver 454, RX processor 456, and controller/processor 459 of FIG. 4, as discussed herein. A module for receiving QCL window 1535 may correspond at least to transceiver 454, RX processor 456, and controller/processor 459 of FIG. 4, as discussed herein. A module for receiving SSB transmitter path route 1540 may correspond at least to transceiver 454, RX processor 456, and controller/processor 459 of FIG. 4, as discussed herein. A module for receiving random access response 1550 may correspond at least to transceiver 454, RX processor 456, and controller/processor 459 of FIG. 4, as discussed herein. A module for estimating SSB transmitter location 1560 may correspond at least to channel estimator 458 and controller/processor 459 of FIG. 4, as discussed herein. A module for transmitting RRC connection request 1570 may correspond at least to transceiver 454, TX processor 468, and controller/processor 459 of FIG. 4, as discussed herein. A module for receiving RRC connection setup 1580 may correspond at least to transceiver 454, RX processor 456, and controller/processor 459 of FIG. 4, as discussed herein. In all of these examples just discussed with reference to FIG. 15, memory may comprise software containing instructions for instructing these various hardware components to perform the functions described herein.

Figure 16:
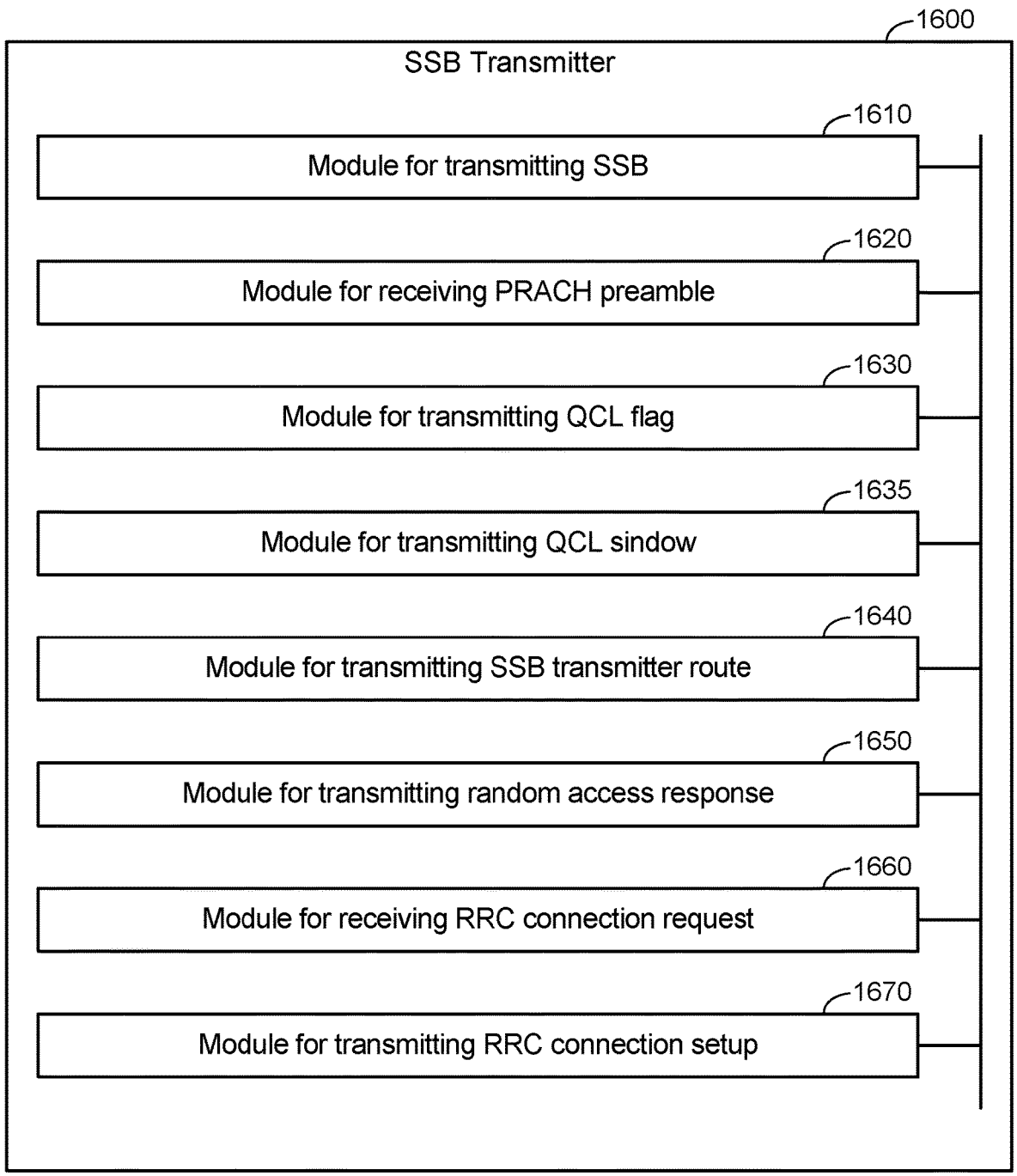
FIG. 16 illustrates a simplified block diagram of an example synchronization signal block transmitter configured to implement mobile-to-mobile beam management approach, according to various aspects.

FIG. 16 illustrates an example SSB transmitter 1600 represented as a series of interrelated functional modules connected by a common bus. A module for transmitting an SSB 1610 may correspond at least to transceiver 418, TX processor 416, and controller/processor 459 of FIG. 4, as discussed herein. A module for receiving PRACH preamble 1620 may correspond at least to transceiver 418, RX processor 470, and controller/processor 475 of FIG. 4, as discussed herein. A module for transmitting QCL flag 1630 may correspond at least to transceiver 418, TX processor 416, and controller/processor 475 of FIG. 4, as discussed herein. A module for transmitting QCL window 1635 may correspond at least to transceiver 418, TX processor 416, and controller/processor 475 of FIG. 4, as discussed herein. A module for transmitting SSB transmitter path route 1640 may correspond at least to transceiver 418, TX processor 416, and controller/processor 475 of FIG. 4, as discussed herein. A module for transmitting random access response 1650 may correspond at least to transceiver 418, TX processor 416, and controller/processor 475 of FIG. 4, as discussed herein. A module for receiving RRC connection request 1660 may correspond at least to transceiver 418, RX processor 470, and controller/processor 475 of FIG. 4, as discussed herein. A module for transmitting RRC connection setup 1670 may correspond at least to transceiver 418, TX processor 416, and controller/processor 475 of FIG. 4, as discussed herein. In all of these examples just discussed with reference to FIG. 16, memory may comprise software containing instructions for instructing these various hardware components to perform the functions described herein.

The functionality of the modules of FIGS. 15-16 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 15-16, as well as other components and functions described herein, may be implemented using any suitable means. Such means also may be implemented, at least in part, using corresponding structure as taught herein. For example, the components described above in conjunction with the "module for" components of FIGS. 15-16 also may correspond to similarly designated "means for" functionality. Thus, in some aspects one or more of such means may be implemented using one or more of processor components, integrated circuits, or other suitable structure as taught herein.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A synchronization signal block (SSB) receiver, comprising:
    a transceiver;
    a memory; and
    a processor communicatively coupled to the transceiver and the memory,
    wherein the transceiver, the memory, and/or the processor are configured to:
        receive, from an SSB transmitter, an SSB on an SSB receive (RX) beam in a transmitter-to-receiver (T2R) direction, the SSB comprising an SSB index corresponding to the SSB RX beam;
        transmit, to the SSB transmitter, a physical random access channel (PRACH) preamble on a first receiver-to-transmitter (R2T) beam in a first R2T direction, the PRACH preamble being based on the SSB; and
        transmit, to the SSB transmitter, the PRACH preamble on a second R2T beam in a second R2T direction different from the first R2T direction
            when a Random Access Response (RAR) is not received from the SSB transmitter within an RAR response window subsequent to transmitting the PRACH preamble on the first R2T beam, and
            when a quasi-collocation (QCL) flag is set to QCL invalid,
    wherein the QCL flag is set to QCL valid when a QCL assumption is valid and is set to QCL invalid when the QCL assumption is not valid, the QCL assumption being valid when first and second SSB transmissions from the SSB transmitter are QCLed, and is invalid otherwise, the first SSB transmission being a transmission of an SSB beam corresponding to an SSB index k at a first time, and the second SSB transmission being a transmission of an SSB beam corresponding to the same SSB index k at a second time different from the first time.

2. The SSB receiver of claim 1, wherein when the QCL flag is set to QCL invalid, the first R2T beam is aligned with the SSB RX beam, and the second R2T beam is not aligned with the SSB RX beam.

3. The SSB receiver of claim 1,
    wherein the QCL flag setting is preconfigured within the SSB receiver, and/or
    wherein the transceiver, the memory, and/or the processor are configured to receive the QCL flag setting from the SSB transmitter.

4. The SSB receiver of claim 3, wherein when the QCL flag setting is received from the SSB transmitter, the QCL flag setting is included in the SSB, in a remaining minimum system information (RMSI), and/or in an other system information (OSI) received from the SSB transmitter.

5. The SSB receiver of claim 1, wherein the transceiver, the memory, and/or the processor are further configured to set the QCL flag from QCL valid to QCL invalid after a QCL window has passed, the QCL window indicating a duration that the QCL flag remains set to QCL valid and then set to QCL invalid thereafter.

6. The SSB receiver of claim 5,
wherein the QCL window is preconfigured within the SSB receiver, and/or
wherein the transceiver, the memory, and/or the processor are configured to receive the QCL window from the SSB transmitter.

7. The SSB receiver of claim 6, wherein when the QCL window is received from the SSB transmitter, the QCL window is included in the SSB, in a remaining minimum system information (RMSI), and/or in an other system information (OSI) received from the SSB transmitter.

8. The SSB receiver of claim 1, wherein the transceiver, the memory, and/or the processor are further configured to:
retransmit, to the SSB transmitter, the PRACH preamble on the first R2T beam with increased power
when the RAR is not received from the SSB transmitter within the RAR response window subsequent to previously transmitting the PRACH preamble on the first R2T beam, and when the QCL flag is set to QCL valid.

9. The SSB receiver of claim 1, wherein the transceiver, the memory, and/or the processor are further configured to:
receive, from the SSB transmitter, an SSB transmitter path route; and
estimate a location of the SSB transmitter based on the SSB transmitter path route,
wherein when the QCL flag is set to QCL invalid, the second R2T direction is such that the second R2T beam is transmitted towards the estimated location of the SSB transmitter.

10. The SSB receiver of claim 9, wherein the SSB transmitter path route is included in the SSB, in a remaining minimum system information (RMSI), and/or in an other system information (OSI) received from the SSB transmitter.

11. The SSB receiver of claim 1,
wherein the T2R direction of the SSB RX beam is a first T2R direction, and
wherein the transceiver, the memory, and/or the processor are further configured to:
receive, from the SSB transmitter, the RAR on a Msg2 RX beam in a second T2R direction; and
transmit, to the SSB transmitter, a radio resource control (RRC) connection request on a third R2T beam in a third R2T direction, the RRC connection request being based on the RAR, and
transmit, to the SSB transmitter, the RRC connection request on a fourth R2T beam in a fourth R2T direction different from the third R2T direction
when a RRC connection setup is not received from the SSB transmitter within an RRC response window subsequent to transmitting the RRC connection request on the third R2T beam, and
when the QCL flag is set to QCL invalid.

12. The SSB receiver of claim 11, wherein when the QCL flag is set to QCL invalid, the third R2T beam is aligned with the Msg2 RX beam, and the fourth R2T beam is not aligned with the Msg2 RX beam.

13. The SSB receiver of claim 11, wherein the transceiver, the memory, and/or the processor are further configured to:
retransmit, to the SSB transmitter, the RRC connection request on the third R2T beam with increased power when
when the RRC connection setup is not received from the SSB transmitter within an RRC response window subsequent to transmitting the RRC connection request on the third R2T beam, and
when the QCL flag is set to QCL valid.

14. The SSB receiver of claim 11, wherein the transceiver, the memory, and/or the processor are further configured to:
receive, from the SSB transmitter, an SSB transmitter path route; and
estimate a location of the SSB transmitter based on the SSB transmitter path route,
wherein when QCL flag is set to QCL invalid, the fourth R2T direction is such that the fourth R2T beam is transmitted towards the estimated location of the SSB transmitter.

15. A synchronization signal block (SSB) transmitter, comprising:
a transceiver;
a memory; and
a processor communicatively coupled to the transceiver and the memory,
wherein the transceiver, the memory, and/or the processor are configured to:
transmit, to an SSB receiver, an SSB on a first transmitter-to-receiver (T2R) in a first T2R direction, the SSB comprising an SSB index corresponding to the first T2R beam;
receive, from the SSB receiver, a physical random access channel (PRACH) preamble on a Msg1 RX beam in a receiver-to-transmitter (R2T) direction, the PRACH preamble being based on the SSB transmitted on the first T2R beam; and
transmit, to the SSB receiver, a Random Access Response (RAR) on a second T2R beam in a second T2R direction in response to receiving the PRACH preamble, the second T2R direction being different from the first T2R direction when a quasi-collocation (QCL) flag is set to QCL invalid,
wherein the QCL flag is set to QCL valid when a QCL assumption is valid and is set to QCL invalid when the QCL assumption is not valid, the QCL assumption being valid when first and second SSB transmissions from the SSB transmitter are QCLed, and is invalid otherwise, the first SSB transmission being a transmission of an SSB beam corresponding to an SSB index k at a first time, and the second SSB transmission being a transmission of an SSB beam corresponding to the same SSB index k at a second time different from the first time.

16. The SSB transmitter of claim 15, wherein the first T2R beam is not aligned with the Msg1 RX beam when the QCL flag is set to QCL invalid.

17. The SSB transmitter of claim 15, wherein the transceiver, the memory, and/or the processor are further configured to transmit, to the SSB receiver, a QCL flag setting of the QCL flag.

18. The SSB transmitter of claim 17, wherein the transceiver, the memory, and/or the processor are configured to transmit the QCL flag setting in the SSB, in a remaining minimum system information (RMSI), and/or in an other system information (OSI).

19. The SSB transmitter of claim 17, wherein the transceiver, the memory, and/or the processor are further configured to transmit, to the SSB receiver, a QCL window to indicate a duration that the QCL flag remains set to QCL valid and then set to QCL invalid thereafter.

20. The SSB transmitter of claim 19, wherein the transceiver, the memory, and/or the processor are configured to transmit the QCL window in the SSB, in a remaining minimum system information (RMSI), and/or in an other system information (OSI).

21. The SSB transmitter of claim 17, wherein the transceiver, the memory, and/or the processor are further configured to transmit an SSB transmitter path route to the SSB receiver.

22. The SSB transmitter of claim 21, wherein the transceiver, the memory, and/or the processor are configured to transmit the SSB transmitter path route in the SSB, in a remaining minimum system information (RMSI), and/or in an other system information (OSI).

23. The SSB transmitter of claim 21,
wherein the transceiver, the memory, and/or the processor are further configured to estimate the second T2R direction based on the SSB transmitter path route and the R2T direction of the Msg1 RX beam, and
wherein when the QCL flag is set to QCL invalid, the second T2R direction is such that the second T2R beam is transmitted towards a location of the SSB receiver.

24. The SSB transmitter of claim 15,
wherein the R2T direction of the Msg1 RX beam is a first R2T direction, and wherein the transceiver, the memory, and/or the processor are further configured to:
receive, from the SSB receiver, a radio resource control (RRC) connection request on a Msg3 RX beam in a second R2T direction, the RRC connection request being based on the RAR, and
transmit, to the SSB receiver, an RRC connection setup on a third T2R beam in a third T2R direction in response to receiving the RRC connection request, the third T2R direction being different from the second T2R direction when the QCL flag is set to QCL invalid.

25. The SSB transmitter of claim 24, wherein the second T2R beam is not aligned with the Msg3 RX beam when the QCL flag is set to QCL invalid.

26. The SSB transmitter of claim 24,
wherein the transceiver, the memory, and/or the processor are further configured to estimate the third T2R direction based on a SSB transmitter path route and the second R2T direction of the Msg3 RX beam, and
wherein when QCL flag is set to QCL invalid, the third T2R direction is such that the third T2R beam is transmitted towards a location of the SSB receiver.

27. A method performed by a synchronization signal block (SSB) receiver, the method comprising:
receiving, from an SSB transmitter, an SSB on an SSB receive (RX) beam in a transmitter-to-receiver (T2R) direction, the SSB comprising an SSB index corresponding to the SSB RX beam;
transmitting, to the SSB transmitter, a physical random access channel (PRACH) preamble on a first receiver-to-transmitter (R2T) beam in a first R2T direction, the PRACH preamble being based on the SSB; and
transmitting, to the SSB transmitter, the PRACH preamble on a second R2T beam in a second R2T direction different from the first R2T direction
when a Random Access Response (RAR) is not received from the SSB transmitter within an RAR response window subsequent to transmitting the PRACH preamble on the first R2T beam, and
when a quasi-collocation (QCL) flag is set to QCL invalid,
wherein the QCL flag is set to QCL valid when a QCL assumption is valid and is set to QCL invalid when the QCL assumption is not valid, the QCL assumption being valid when first and second SSB transmissions from the SSB transmitter are QCLed, and is invalid otherwise, the first SSB transmission being a transmission of an SSB beam corresponding to an SSB index k at a first time, and the second SSB transmission being a transmission of an SSB beam corresponding to the same SSB index k at a second time different from the first time.

28. The method of claim 27, wherein when the QCL flag is set to QCL invalid, the first R2T beam is aligned with the SSB RX beam, and the second R2T beam is not aligned with the SSB RX beam.

29. The method of claim 27, wherein the QCL flag setting is preconfigured within the SSB receiver, and/or is received from the SSB transmitter.

30. The method of claim 27, further comprising:
setting the QCL flag from QCL valid to QCL invalid after a QCL window has passed, the QCL window indicating a duration that the QCL flag remains set to QCL valid and then set to QCL invalid thereafter.

31. The method of claim 27, further comprising:
receiving, from the SSB transmitter, an SSB transmitter path route; and
estimating a location of the SSB transmitter based on the SSB transmitter path route,
wherein when the QCL flag is set to QCL invalid, the second R2T direction is such that the second R2T beam is transmitted towards the estimated location of the SSB transmitter.

32. The method of claim 27,
wherein the T2R direction of the SSB RX beam is a first T2R direction, and
wherein the method further comprises:
receiving, from the SSB transmitter, the RAR on a Msg2 RX beam in a second T2R direction; and
transmitting, to the SSB transmitter, a radio resource control (RRC) connection request on a third R2T beam in a third R2T direction, the RRC connection request being based on the RAR, and
transmitting, to the SSB transmitter, the RRC connection request on a fourth R2T beam in a fourth second R2T direction different from the third R2T direction when a RRC connection setup is not received from the SSB transmitter within an RRC response window subsequent to transmitting the RRC connection request on the third R2T beam, and
when the QCL flag is set to invalid.

33. A method performed by a synchronization signal block (SSB) transmitter, the method comprising:
transmitting, to an SSB receiver, an SSB on a first transmitter-to-receiver (T2R) in a first T2R direction, the SSB comprising an SSB index corresponding to the first T2R beam;
receiving, from the SSB receiver, a physical random access channel (PRACH) preamble on a Msg1 RX beam in a receiver-to-transmitter (R2T) direction, the PRACH preamble being based on the SSB transmitted on the first T2R beam; and
transmitting, to the SSB receiver, a Random Access Response (RAR) on a second T2R beam in a second T2R direction in response to receiving the PRACH preamble, the second T2R direction being different from the first T2R direction when a quasi-collocation (QCL) flag is set to QCL invalid, wherein the QCL flag is set to QCL valid when a QCL assumption is valid and is set to QCL invalid when the QCL assumption is not valid, the QCL assumption being valid when first and second SSB transmissions from the SSB transmitter are QCLed, and is invalid otherwise, the first SSB transmission being a transmission of an SSB beam corresponding to an SSB index k at a first time, and the second SSB transmission being a transmission of an SSB beam corresponding to the same SSB index k at a second time different from the first time.

34. The method of claim 33, wherein the first T2R beam is not aligned with the Msg1 RX beam when the QCL flag is set to QCL invalid.

35. The method of claim 33, further comprising:
transmitting, to the SSB receiver, a QCL flag setting of the QCL flag.

36. The method of claim 33, further comprising:
transmitting, to the SSB receiver, a QCL window to indicate a duration that the QCL flag remains set to QCL valid and then set to QCL invalid thereafter.

37. The method of claim 33, further comprising:
estimating the second T2R direction based on a SSB transmitter path route and the R2T direction of the Msg1 RX beam,
wherein when the QCL flag is set to QCL invalid, the second T2R direction is such that the second T2R beam is transmitted towards an estimated location of the SSB receiver.

38. The method of claim 33, further comprising
receiving, from the SSB receiver, a radio resource control (RRC) connection request on a Msg3 RX beam in a second R2T direction, the RRC connection request being based on the RAR, and
transmitting, to the SSB receiver, an RRC connection setup on a third T2R beam in a third T2R direction in response to receiving the RRC connection request, the third T2R direction being different from the second T2R direction when the QCL flag is set to QCL invalid.

* * * * *